(12) United States Patent
Preidt et al.

(10) Patent No.: US 11,131,065 B1
(45) Date of Patent: Sep. 28, 2021

(54) RAIL SYSTEM FOR A CONVEYING VEHICLE AND STORAGE SYSTEM

(71) Applicant: TGW Mechanics GmbH, Wels (AT)

(72) Inventors: Peter Preidt, Holzhausen (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 429 days.

(21) Appl. No.: 16/332,488

(22) PCT Filed: Aug. 31, 2017

(86) PCT No.: PCT/AT2017/060214
§ 371 (c)(1),
(2) Date: Mar. 12, 2019

(87) PCT Pub. No.: WO2018/049441
PCT Pub. Date: Mar. 22, 2018

(30) Foreign Application Priority Data

Sep. 13, 2016 (AT) .............................. A 50818/2016

(51) Int. Cl.
*E01B 11/26* (2006.01)
*E01B 11/12* (2006.01)
(Continued)

(52) U.S. Cl.
CPC .............. *E01B 11/26* (2013.01); *E01B 11/12* (2013.01); *E01B 11/24* (2013.01); *E01B 25/10* (2013.01); *E01B 2204/06* (2013.01)

(58) Field of Classification Search
CPC .......... E01B 11/12; E01B 11/24; E01B 11/26; E01B 25/10; E01B 2204/06; B65G 1/04;
(Continued)

(56) References Cited

U.S. PATENT DOCUMENTS

| 777,239 | A | * | 12/1904 | Bundy | ..................... | E01B 11/26 |
| | | | | | | 238/241 |
| 825,656 | A | * | 7/1906 | Johnson | .................. | E01B 11/26 |
| | | | | | | 238/234 |

(Continued)

FOREIGN PATENT DOCUMENTS

| AT | 324388 B | 8/1975 |
| CN | 1309074 A | 8/2001 |

(Continued)

OTHER PUBLICATIONS

International Search Report in PCT/AT2017/060214, dated Dec. 12, 2017.

(Continued)

*Primary Examiner* — Jason C Smith
(74) *Attorney, Agent, or Firm* — Collard & Roe, P.C.

(57) ABSTRACT

A rail system for a conveyor vehicle capable of traveling along the rail system for storage of piece goods into a storage rack or retrieval of piece goods from a storage rack includes a first running rail, a second running rail and a connecting device, which includes a positive locking connection between the ends, directed toward one another, of the first running rail and second running rail. At its end, the first running rail forms a first interlocking element and a first surface portion. At its end, the second running rail forms a second interlocking element and a second surface portion. Therein the first interlocking element and second interlocking element engage in one another in complementary manner and the ends of the first running rail and second running rail abut at the surface portions in a butt-jointed manner. Furthermore, a warehouse system has such a rail system.

16 Claims, 13 Drawing Sheets

(51) Int. Cl.
  *E01B 25/10* (2006.01)
  *E01B 11/24* (2006.01)
(58) Field of Classification Search
  CPC .. B65G 1/0421; B65G 1/0485; B65G 1/1371; B65G 1/137
  See application file for complete search history.

(56) References Cited

U.S. PATENT DOCUMENTS

| | | | | |
|---|---|---|---|---|
| 866,259 A * | 9/1907 | Cole | ............ | F16M 11/20 248/166 |
| 886,259 A * | 4/1908 | Skiles | ............ | E01B 11/26 238/231 |
| 1,343,605 A * | 6/1920 | Winslow | ............ | E01B 11/26 238/231 |
| 1,413,378 A * | 4/1922 | Beltramini | ............ | E01B 11/26 238/241 |
| 4,485,967 A * | 12/1984 | Edwards | ............ | E01B 11/32 238/226 |
| 6,422,799 B1 * | 7/2002 | Birkigt | ............ | B65G 1/0492 212/312 |
| 6,425,333 B2 * | 7/2002 | Theurer | ............ | B61D 15/00 104/2 |
| 9,428,336 B2 * | 8/2016 | Hagen | ............ | G07F 11/165 |
| 9,914,588 B2 * | 3/2018 | Visser | ............ | A01G 9/143 |
| 2003/0185656 A1 * | 10/2003 | Hansl | ............ | B65G 1/0435 414/277 |
| 2015/0291181 A1 * | 10/2015 | Knape | ............ | B61D 3/02 410/52 |
| 2015/0336741 A1 * | 11/2015 | Ahammer | ............ | B65G 1/0485 414/281 |
| 2018/0127208 A1 * | 5/2018 | Preidt | ............ | B65G 1/0435 |
| 2018/0134488 A1 * | 5/2018 | Grosse | ............ | B65G 1/0435 |
| 2018/0346242 A1 * | 12/2018 | Grosse | ............ | B65G 1/0457 |
| 2018/0370726 A1 * | 12/2018 | Grosse | ............ | B65G 1/1371 |
| 2020/0017303 A1 * | 1/2020 | Grosse | ............ | B60L 5/38 |

FOREIGN PATENT DOCUMENTS

| | | |
|---|---|---|
| CN | 2458332 Y | 11/2001 |
| CN | 2557576 Y | 6/2003 |
| CN | 101031687 A | 9/2007 |
| CN | 201411605 Y | 2/2010 |
| CN | 102822418 A | 12/2012 |
| CN | 203821178 U | 9/2014 |
| CN | 104903516 A | 9/2015 |
| DE | 9472 U | 3/1955 |
| DE | 9472 U | 2/1960 |
| DE | 195 34 291 A1 | 3/1997 |
| DE | 201 06 841 U1 | 8/2001 |
| DE | 10 2008 031 153 B4 | 11/2010 |
| EP | 2 419 365 B1 | 6/2013 |
| JP | S5160008 U | 1/1976 |
| JP | S64-14401 A | 1/1989 |
| WO | 2010/118445 A1 | 10/2010 |
| WO | 2013/147597 A1 | 10/2013 |

OTHER PUBLICATIONS

Letter from the Austrian Patent Attorney to the European Patent Office in PCT/AT2017/060214, dated Aug. 10, 2018, with English translation of relevant parts.

* cited by examiner

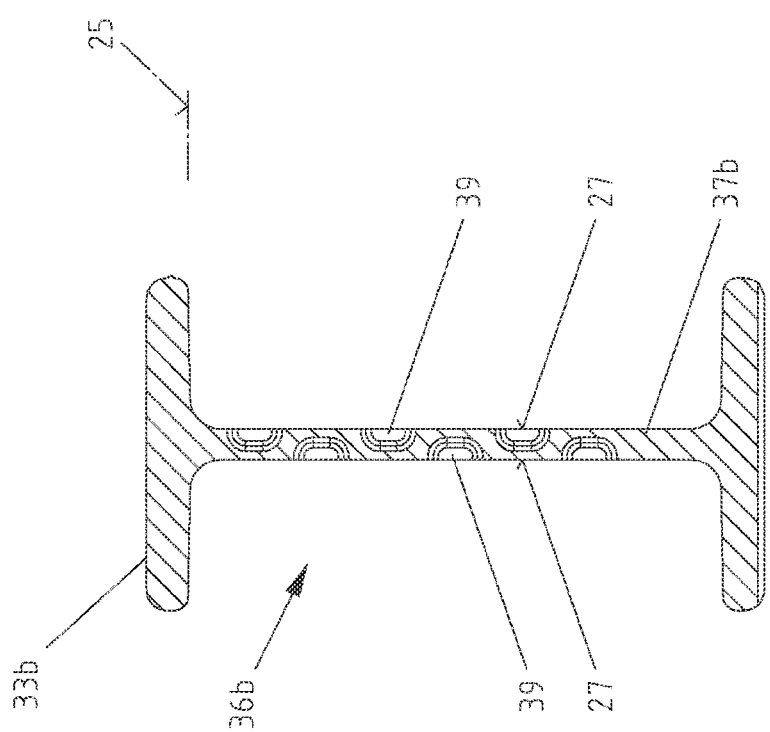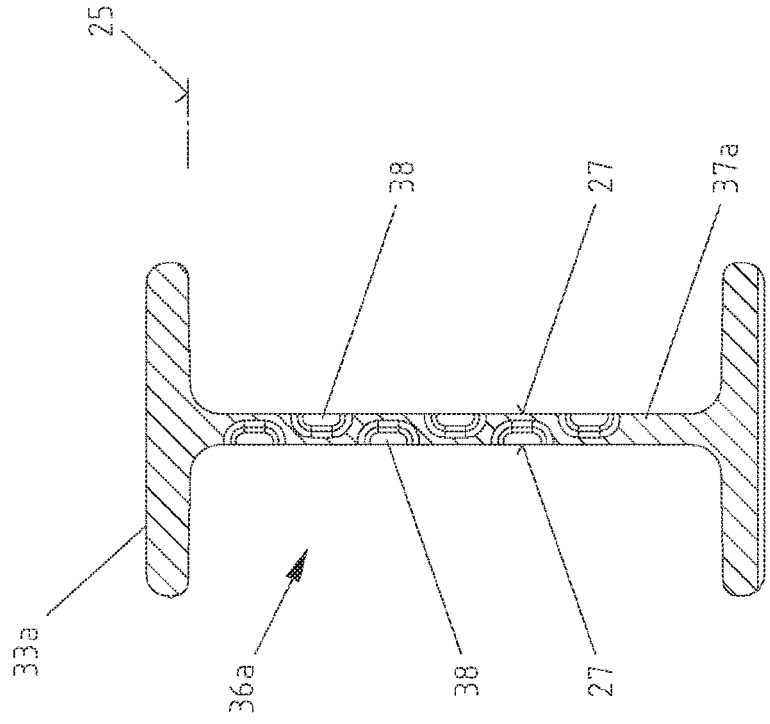

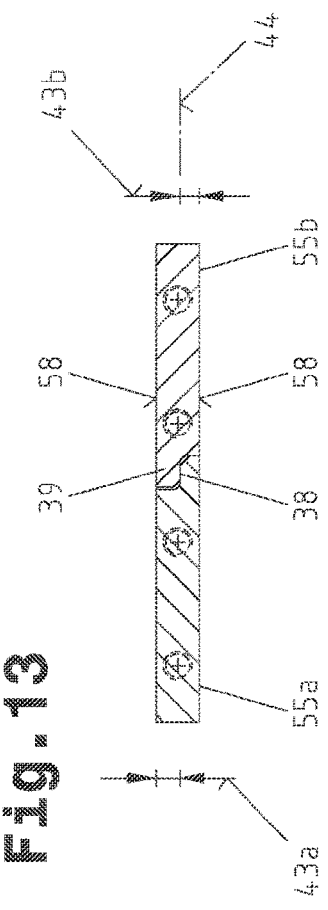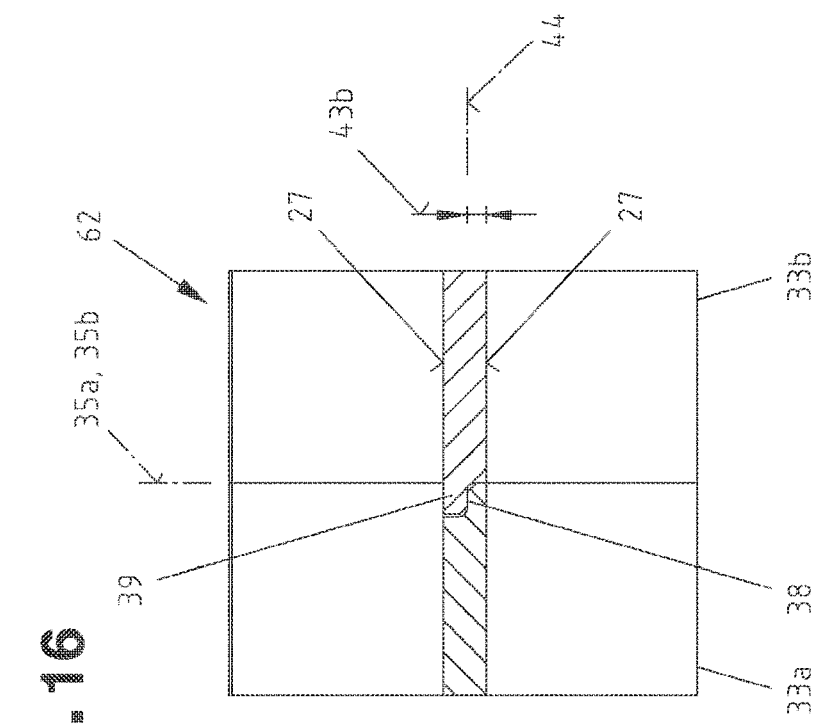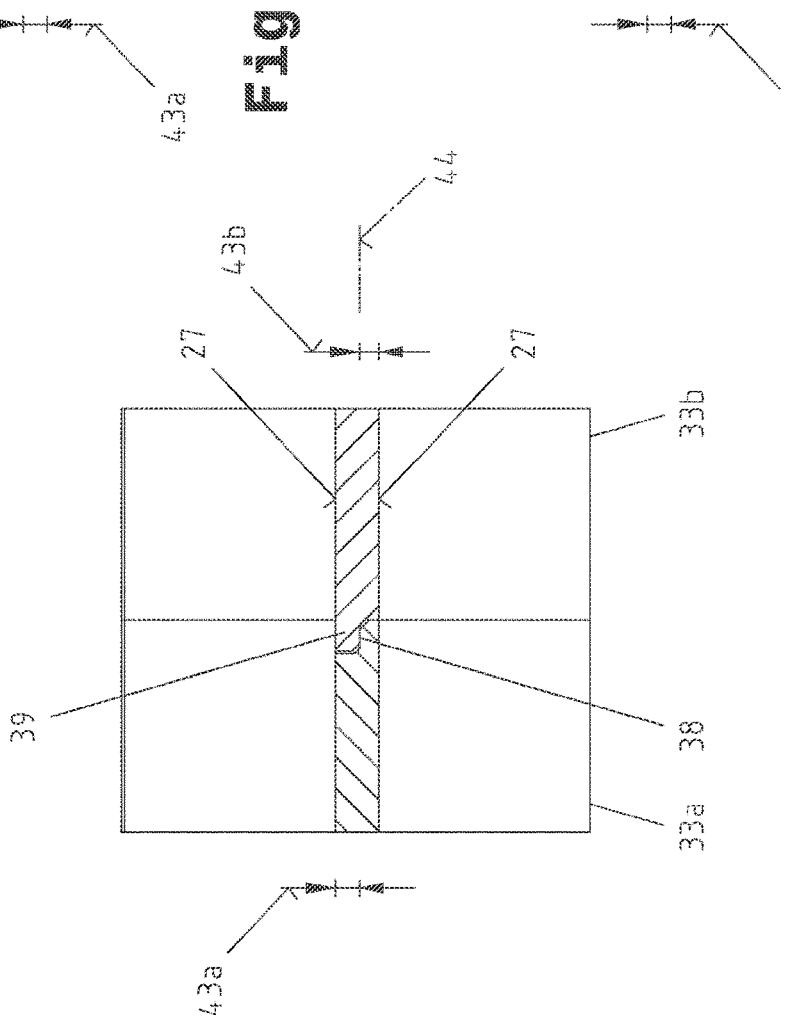

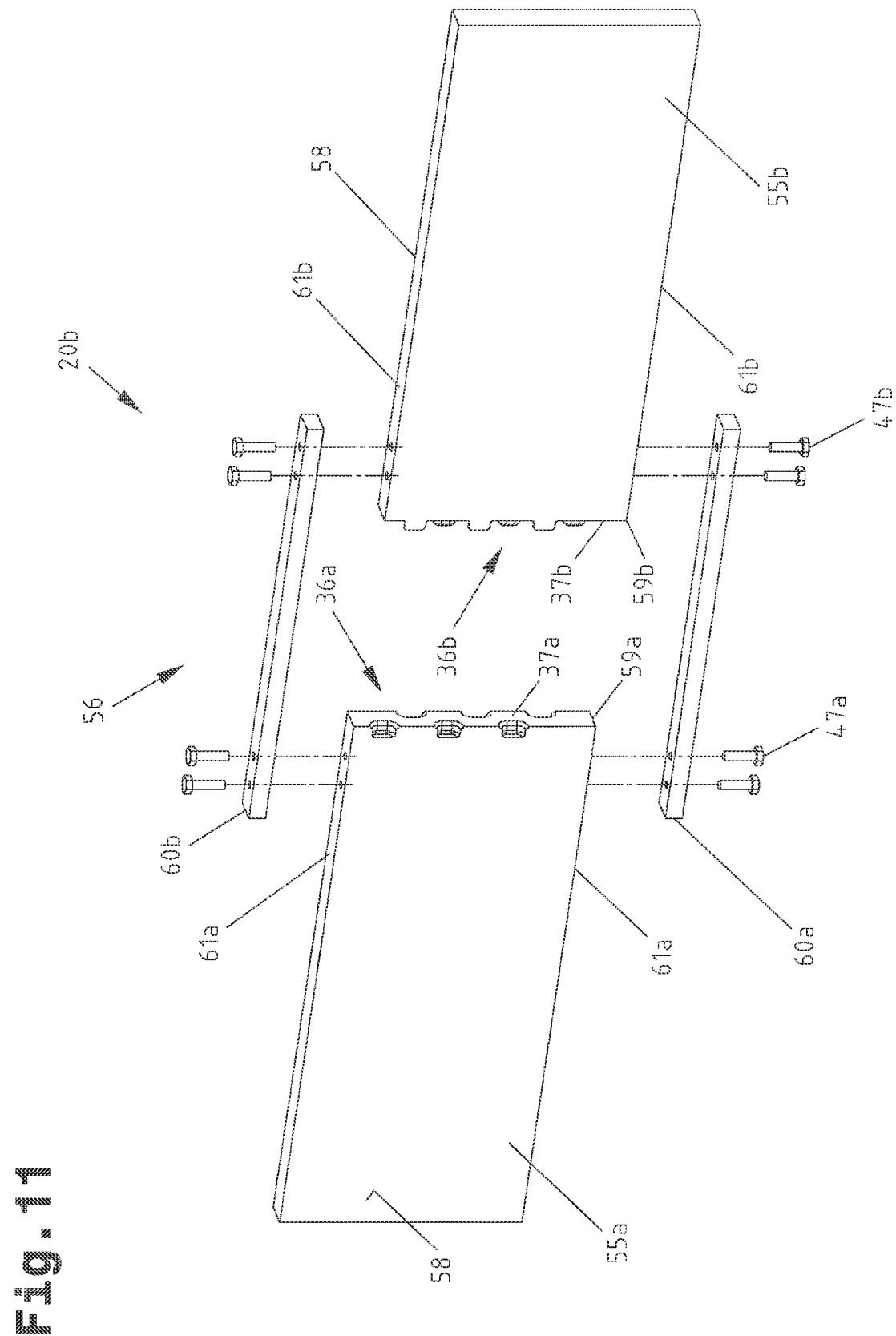

RAIL SYSTEM FOR A CONVEYING VEHICLE AND STORAGE SYSTEM

CROSS REFERENCE TO RELATED APPLICATIONS

This application is the National Stage of PCT/AT2017/060214 filed on Aug. 31, 2017, which claims priority under 35 U.S.C. § 119 of Austrian Application No. A 50818/2016 filed on Sep. 13, 2016, the disclosure of which is incorporated by reference. The international application under PCT article 21(2) was not published in English.

BACKGROUND OF THE INVENTION

Field of the Invention

The invention relates to a rail system for a conveyor vehicle capable of traveling along it for storage of piece goods into a storage rack or retrieval of piece goods from a storage rack, comprising a first running rail, a second running rail and a connecting device, which comprises an interlocking connection, i.e. positive locking connection, between the ends, directed toward one another, of the first running rail and second running rail. Furthermore, the invention relates to a warehouse system having at least one storage rack and a rail system extending along the storage rack and a conveyor vehicle for storage of piece goods in the storage rack or retrieval of piece goods from the storage rack, wherein the rail system comprises a first running rail and a second running rail and forms guide tracks, and wherein the conveyor vehicle has a chassis with running wheels bearing in rolling relationship on the guide tracks and a traveling drive for the drive of at least one of the running wheels.

Description of the Related Art

U.S. Pat. No. 886,259 A and U.S. Pat. No. 4,485,967 A disclose a rail system comprising a first running rail, a second running rail and a connecting device, which forms an interlocking connection between the ends, directed toward one another, of the first running rail and second running rail. The rail system comprises at least one guide track along the first running rail and second running rail, on which a running wheel of a chassis bears in rolling relationship. Specifically, the guide track is formed on the upper flange of the first running rail and second running rail. At its end, the first running rail forms a first interlocking element and a first surface portion. At its end, the second running rail forms a second interlocking element and a second surface portion. Specifically, the first interlocking element and the second interlocking element are disposed on the upper flange, lower flange and vertical web. The first interlocking element and the second interlocking element adjoin the at least one guide track. It is disadvantageous that the first end and second end are held relative to one another at a spacing and a gap is formed between the first running rail and second running rail, thus leading to increased wear on a running wheel when this is moved over the rail joint.

DD9472U discloses a rail system having a first running rail and a second running rail, the ends of which are directed toward one another and which are connected to one another via additional bolts having mutual longitudinal spacing.

According to DE 10 2008 031 153 B4 also, additional spikes are provided between the ends of the first running rail and second running rail.

It is also known that the ends of the first running rail and second running rail are welded to one another. The welding must take place on the spot at the construction site, and it proves to be very laborious. It is problematic when the welding has to be performed in fire-endangered surroundings. In this case, correspondingly complex fire-protection measures have to be taken.

In JPS 64-14401 A, a fastening device for the rail system is described.

SUMMARY OF THE INVENTION

The task underlying the present invention is to provide a rail system of at least two running rails, in which the individual running rails may be connected with little effort on the construction site. The rail system is intended to be used in a warehouse system having a rail-bound conveyor vehicle.

The task of the invention is accomplished in that the first running rail forms a first interlocking element and a first surface portion at its end and the second running rail forms a second interlocking element and a second surface portion at its end, wherein the first interlocking element and second interlocking element engage in one another in complementary manner and the ends of the first running rail and second running rail bear on one another abuttingly with the surface portions. It is of advantage that the first interlocking element is formed in one piece at the end of the first running rail and the second interlocking element is formed in one piece at the end of the second running rail. The interlocking connection between the first running rail and second running rails does not need any additional connecting elements, such as bolts, dowel pins. The first interlocking element and second interlocking element are produced, for example, in the chip-removing fabrication method or in the forming method. In particular, it is of advantage that the first running rail and second running rail can be factory-prefabricated and only the interlocking connection has to be made on the construction site. A subsequent machining of the running-rail connection may be unnecessary in most cases. If a machining should be necessary, it is restricted to the grinding of the running-rail connection on the guide track/the guide tracks.

The task of the invention is also accomplished in that (exclusively) the first surface portion and (exclusively) the second surface portion respectively adjoin the at least one guide track and the first interlocking element and second interlocking element engage in one another in complementary manner and the ends of the first running rail and second running rail bear on one another abuttingly with the surface portions, so that an "almost gap-free" transition to the at least one guide track is formed between the first running rail and second running rail. In this context, the term "almost gap-free" may be understood to mean that a gap size dependent on the fabrication tolerances results at the surface portions and amounts at most to 0.2 mm. A subsequent machining of the running-rail connection in the region of the guide track may be unnecessary in most cases. If a machining should be necessary, it is restricted to the grinding of the running-rail connection on the guide track/the guide tracks. An additional substance-to-substance bonding, for example welding with filler metal, may be unnecessary.

This substantially "gap-free" transition to the guide track is quite decisive for the load on the running wheel. The running wheel is able to roll smoothly over the connecting joint, especially on a horizontal guide track, on which the rack servicing machine with its dead weight/live weight lies in rolling relationship via the running wheel. Thereby the rail system is suitable in particular for highly dynamic rack servicing machines and/or rack servicing machines with high dead weight/live weight.

It also proves to be of advantage when the first interlocking element is formed by at least one positioning opening disposed in recessed manner in the end and the second interlocking element is formed by at least one positioning projection protruding perpendicularly at the end. The positioning opening is preferably configured as a slot open on one side and it adjoins a guide track for a running wheel of the conveyor vehicle formed in longitudinal direction of the rail system on the first running rail. The positioning projection is preferably configured at a pin and it adjoins a guide track for a running wheel of the conveyor vehicle formed in longitudinal direction of the rail system on the second running rail.

In particular, it proves to be of advantage when the first running rail and the second running rail are equipped with at least one guide track, extending in longitudinal direction of the rail system, for a running wheel of the conveyor vehicle and that the first interlocking element and the second interlocking element form contact faces turned toward one another and in direction perpendicular to the guide track are braced with the contact faces against one another. The contact faces extend preferably parallel to a longitudinal plane extending in longitudinal direction of the rail system. In principle, however, the contact faces may also extend in inclined manner and enclose an angle with the longitudinal plane. Large lateral forces in a direction perpendicular to the guide track or longitudinal plane can be absorbed by the interlocking connection (first interlocking element and second interlocking element). This is of advantage in particular when the traveling drive for the conveyor vehicle is equipped with a drive wheel bearing in rolling relationship on the guide track and the drive force is transmitted frictionally to the running rails.

According to one embodiment of the invention, the first running rail and second running rail respectively form a lower flange, an upper flange and a vertical web connecting these. In this context it is of advantage that the first interlocking element is formed on the vertical web of the first running rail and the second interlocking element is formed on the vertical web of the second running rail. The tensile and compressive stresses and strains on the vertical web are smaller than in the lower flange and upper flange, wherewith a reliable interlocking connection is durably achieved between the first running rail and second running rail.

It is of advantage when the first surface portion is formed on the lower flange and/or upper flange of the first running rail. The first surface portion may also be formed on the vertical web and adjoined to the first interlocking element. The second surface portion is formed on the lower flange and/or upper flange of the second running rail. The second surface portion may also be formed on the vertical web and adjoined to the second interlocking element. If the first running rail and the second running rail are aligned and positioned with the ends toward one another, the ends of the first running rail and second running rail lie with the surface portions abuttingly on one another, while the interlocking elements are positioned toward one another in longitudinal direction of the rail system. An almost gap-free transition is achieved between the first running rail and second running rail. The drive wheel is able to roll over the connecting joint particularly smoothly. Thus the availability of the conveyor vehicle is increased.

According to one embodiment of the invention, the connecting device may comprise an arrangement for fixation of a relative location between the first running rail and second running rail. In other words, after the positioning of the first running rail and second running rail relative to one another in longitudinal direction of the rail system, the first running rail and second running rail are held in fixed manner relative to one another by means of the arrangement such that, even during operation of the conveyor vehicle, the ends of the first running rail and second running rail lie with the surface portions abuttingly on one another.

The arrangement for fixation of a relative location between the first running rail and second running rail or the connecting device may comprise a connecting beam, which is connected via a first fixation means to an end region of the first running rail and via a second fixation means to an end region of the second running rail. Even when the connecting beam is not absolutely necessary, it proves to be of advantage to couple the first running rail and second running rail to one another via the connecting beam. The connecting beam comprises a baseplate, on which the first running rail and second running rail lie with their end regions. Thereby the first running rail and second running rail may be aligned toward one another in a direction perpendicular to the baseplate.

In this context, it may prove to be of advantage when an interlocking connection is provided between the connecting beam and the first running rail and an interlocking connection is provided between the connecting beam and the second running rail.

It is favorable when the first running rail forms a first interlocking element on the lower flange close to the the end and the second running rail forms a second interlocking element on the lower flange close to the end, and the connecting beam has a first interlocking element and a second interlocking element, wherein respectively the first interlocking elements and respectively the second interlocking elements engage in one another in complementary manner.

Due to the interlocking connections, the rail system may be exposed to the largest tensile forces that may occur during the normal operation of a conveyor vehicle. The conveyor vehicle may be moved in highly dynamic manner along the rail system, which acts positively on the storage and retrieval capacity of the conveyor vehicle.

If no connecting beam is used, the arrangement for fixation of a relative location between the first running rail and second running rail is provided by at least one fastening device per running rail, wherein the fastening device has a carrier plate disposed underneath the rail system and protruding with mounting portions on both sides of the rail system, as well as a clamping unit for mounting of the rail system on the carrier plate. The clamping unit comprises clamping plates disposed on both sides of the rail system and one tightening means per clamping plate.

An embodiment in which the first running rail and the second running rail are equipped with a guide track, extending in longitudinal direction of the rail system, for a running wheel of the conveyor vehicle proves to be particularly advantageous, wherein at least one of the interlocking elements adjoins the guide track and forms a sub-portion of the guide track. It serves at least one of the interlocking elements not merely of the interlocking connection but also of the guide of a running wheel of the conveyor vehicle.

In a preferred configuration of the invention, the running rails are produced in the forming method and by cropping to a standard length, and are equipped with a marking. Thus, after the cutting to length of the running-rail profile into several pieces of individual running rails, an unambiguous correlation of the orientation of the running rails (which preferably are symmetrically configured) is possible.

However, the task of the invention is also accomplished in that the rail system is used in a warehouse system, in which a (computer-assisted) conveyor vehicle is moved in highly dynamic manner along the rail system.

It proves to be of advantage when the rail system is mounted on rail-bracing plates via fastening devices disposed in distributed manner along the first running rail and second running rail, wherein the rail-bracing plates are anchored on an adjacent building part. The first running rail and second running rail respectively form a lower flange, an upper flange and a vertical web connecting these. The fastening devices respectively comprise a carrier plate disposed underneath the rail system and protruding with mounting portions on both sides of the rail system, as well as a clamping unit for mounting of the rail system on the carrier plate. The clamping unit comprises clamping plates disposed on both sides of the rail system as well as one tightening means per clamping plate, wherein the clamping plates respectively form a tightening portion bearing with a pressing force against the lower flange and a bracing portion lying on the carrier plate in the mounting portion and a through-opening for accommodation of the tightening means, and the tightening means are anchored on the mounting portions. With this clamping system, a particularly rapid mounting of the rail system may be achieved.

An exact leveling of the rail system is achieved when the carrier plate on the mounting portions is mounted on the rail-bracing plate respectively via a height-adjusting device.

BRIEF DESCRIPTION OF THE DRAWINGS

For better understanding of the invention, it will be explained in more detail on the basis of the following figures.

Therein, respectively:

FIG. 8 shows the first running rail in an end view;

FIG. 9 shows the second running rail in an end view;

FIG. 10 shows a sectional diagram through the interlocking connection of the interlocking elements engaging in one another, according to the line X in FIG. 4;

FIG. 11 shows a second embodiment of a connecting device for the running rails of a second embodiment of a rail system, in an exploded diagram;

FIG. 13 shows a sectional diagram through the interlocking connection of the interlocking elements engaging in one another, according to the line XIII in FIG. 12;

FIG. 16 shows a sectional diagram through the interlocking connection of the interlocking elements engaging in one another of the rail system having the third embodiment of the connecting device;

DETAILED DESCRIPTION OF PREFERRED EMBODIMENTS

By way of introduction, it is pointed out that like parts in the differently described embodiments are denoted with like reference symbols or like structural-part designations, wherein the disclosures contained in the entire description can be carried over logically to like parts with like reference symbols or like structural-part designations. The position indications chosen in the description, such as top, bottom, side, etc., for example, are also relative to the figure being directly described as well as illustrated, and these position indications are to be logically carried over to the new position upon a position change.

Figure 1:
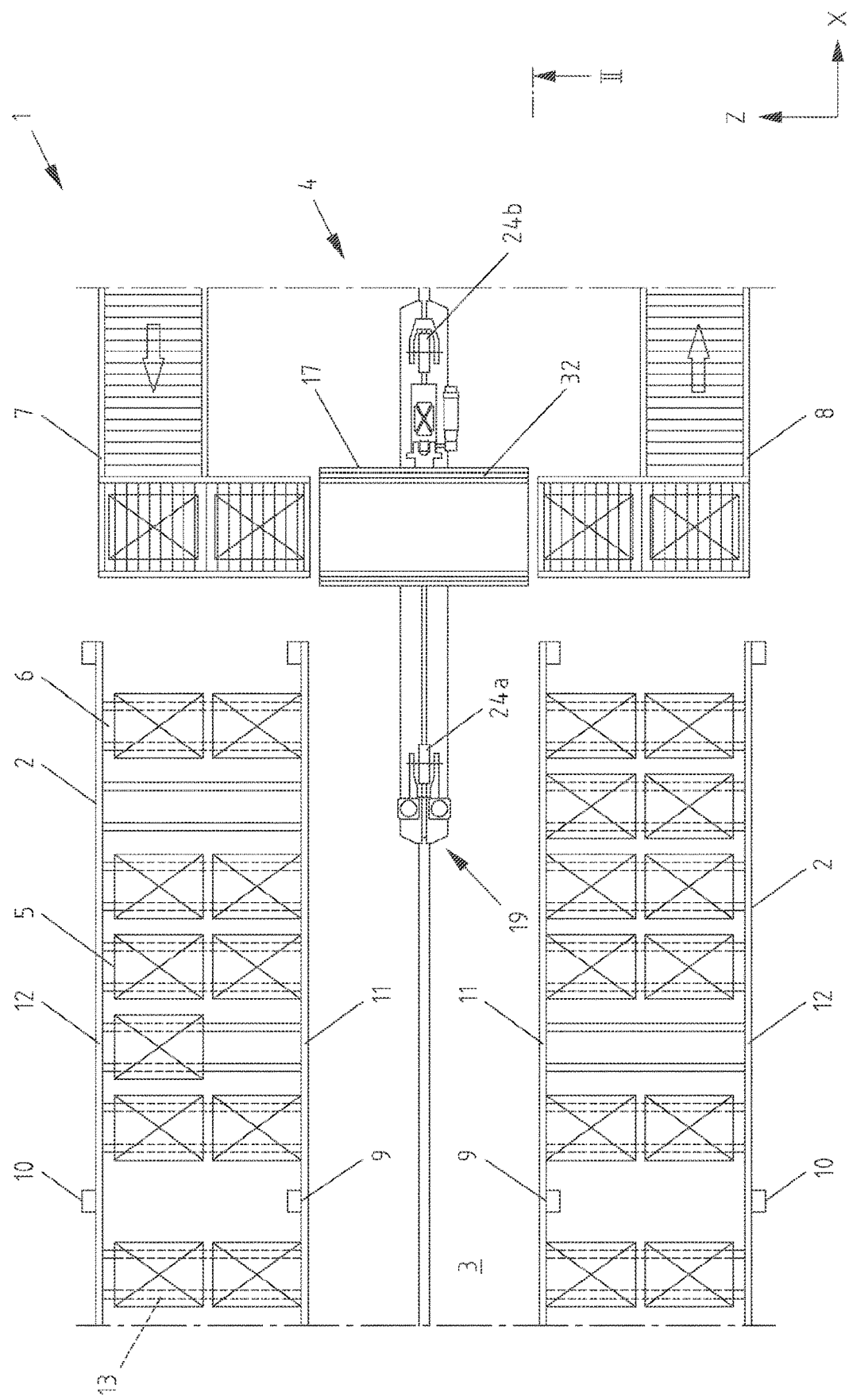
FIG. 1 shows a detail of a warehouse system having a conveyor vehicle, in overhead view of a rack level.
Figure 2:
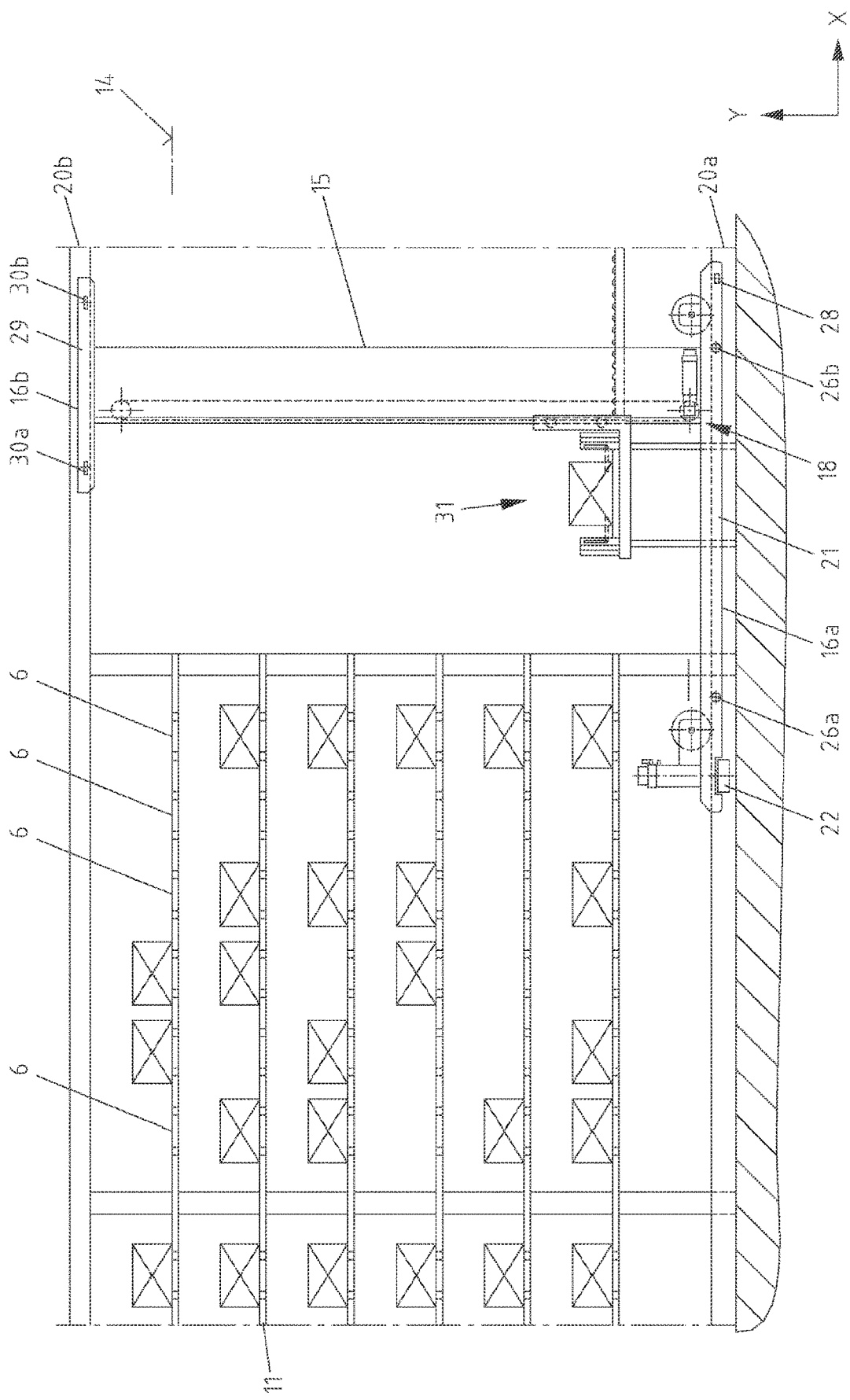
FIG. 2 shows the warehouse system in a view according to line II in FIG. 1.

In FIGS. 1 and 2, a possible embodiment is shown of a warehouse system 1 in different views. According to the shown embodiment, the warehouse system 1 comprises storage racks 2 disposed in parallel, a (computer-assisted) conveyor vehicle 4, disposed in a rack aisle 3 (x-direction) for transport of piece goods 5 to storage locations 6 or for transport of piece goods 5 from the storage locations 6 and an automated conveyer system for incoming transport of piece goods 5 and outgoing transport of piece goods 5. The automated conveyor system may comprise a first conveyor device 7 for incoming transport of the piece goods 5 to the conveyor vehicle 4 and a second conveyor device 8 for outgoing transport of piece goods 5 from the conveyor vehicle 4. The warehouse system 1 may also have more than two storage racks 2, wherein respectively one rack aisle 3 is formed between neighboring storage racks 2 and a (computer-assisted) conveyor vehicle 4 is disposed in each of these rack aisles 3. It is also possible that only one single storage rack 2 may be provided.

The storage racks 2 shown by way of example may respectively comprise the vertical front rack uprights 9 next to the rack aisle 3 and vertical rear rack uprights 10 distant from the rack aisle 3. The front rack uprights 9 are connected to front longitudinal traverses 11 extending horizontally in the direction of the rack aisle 3 and the rear rack uprights 10 are connected to rear longitudinal traverses 12 extending horizontally in the direction of the rack aisle 3. Crossbeams 13, which extend in depth direction of a storage rack 1 (z-direction), may be provided between the longitudinal traverses 11, 12. In this case, the crossbeams 13 form a storage surface or storage locations 6. Depending on width dimension, a piece goods 5 is stored on at least two crossbeams 13.

Thus each storage rack 2 respectively forms a large number of storage locations 6 next to one another in storage levels 14 lying one above the other. In this situation, the piece goods 5 are stored in depth direction (z-direction) of the storage rack on the storage locations 6 present at depth positions lying one behind the other. One piece goods 5 is allocated to each storage location 6. The number of the storage locations 6 lying one behind the other may vary depending on a length dimension of the piece goods 5. Thus, for example, four piece goods 5, three piece goods 5 or two piece goods 5 may be stored in depth direction (z-direction). This type of storage is known to the person skilled in the art as multiple deep storage. However, it would also be possible to store merely one piece goods 5 in depth direction (z-direction). This type of storage is known to the person skilled in the art as single-deep storage. Even if the piece goods 5 are shown with the same width in the figures for reasons of better clarity, they may also have different width and/or length dimensions. Examples of the piece goods 5 are packing units (packages) or loading aids (LHM), such as cartons, trays or bins, etc.

The conveyor vehicle 4 shown in FIGS. 1 and 2 is formed by a rack servicing machine, as was known, for example, from EP 2 419 365 B1.

The rack servicing machine comprises a vertical mast 15, a lower chassis 16*a* fastened on the mast foot, an upper chassis 16*b* fastened on the mast head, at least one receiving platform 17 disposed on the mast 15, a lifting drive 18 for the movement of the receiving platform 17 in y-direction and a traveling drive 19 for the movement of the rack servicing machine in x-direction. The lower chassis 16*a* is guided on a lower rail system 20*a* and the upper chassis 16*b* on an upper rail system 20*b*. The lower rail system 20*a* is mounted on the floor of a building via fastening devices (not illustrated in FIGS. 1 and 2). The upper rail system 20*b* may either be fastened on the storage racks 2 via traverses (not illustrated) or mounted on the ceiling of a building via fastening devices (not illustrated). According to this embodiment, the lower rail system 20*a* and upper rail system 20*b* are disposed in the rack aisle 3 and extend between the storage racks 2. If only one storage rack 2 is provided, the lower rail system 20*a* and upper rail system 20*b* extend along this storage rack 2. As can be seen, the rack servicing machine is mounted via the traveling drive 19 in a manner that it can travel in x direction on the rail systems 20*a*, 20*b*.

The lower chassis 16*a* comprises the traveling drive 19 and a lower traveling frame 21. The traveling drive 19 is formed by at least one electrical drive motor and a drive wheel 22 (or running wheel) coupled to it. Preferably, two drive motors and two drive wheels 22 (or running wheels) are provided. The transmission of force of the lower chassis 16*a* to the rail system 20*a* takes place via the driven, frictionally acting drive wheels 22.

On the traveling frame 21, running wheels 24*a*, 24*b* are mounted one behind the other in the direction of movement of the rack servicing machine (x-direction) on both sides of the mast 15 such that they bear in rolling relationship on a first guide track 23 (FIG. 3) of the rail system 20*a* and can rotate around horizontal axles. Additionally on the traveling frame 21, pairs of running wheels 26*a*, 26*b* (counter rollers) lying next to one another are mounted one behind the other in the direction of movement of the rack servicing machine (x-direction) on both sides of the mast 15 such that they bear in rolling relationship on a second guide track 25 (FIG. 4, 17) of the rail system 20*a* and can rotate around horizontal axles. The lateral guidance of the lower chassis 16*a* is achieved at one end of the traveling frame 21 by running wheels (guide rollers) 28 lying next to one another in pairs such that they bear in rolling relationship on third guide track 27 (FIG. 3) of the rail system 20*a* and can rotate around perpendicular axles, and at the other end of the traveling frame 21 by the drive wheels 22 lying next to one another in pairs such that they bear in rolling relationship on the third guide track 27 of the rail system 20*a* and can rotate around perpendicular axles.

The upper chassis 16*b* comprises an upper traveling frame 29, on which two pairs of running wheels (guide rollers) 30*a*, 30*b* are mounted such that they can rotate around perpendicular axles and which, on both sides of the mast 15, bear one behind the other, in the direction of movement of the rack servicing machine (x-direction), in rolling relationship on vertical guide tracks 58 (FIG. 11) of the upper rail system 20*b*.

It must be pointed out expressly that this described drive and guide concept represents one of many possibilities. A drive and guide concept disclosed in DE 195 34 291 A1 is also conceivable. For example, the rack servicing machine may also comprise only one running wheel 24*a*. This running wheel 24*a* may also be driven.

Even when, according to the shown embodiment, the rack servicing machine is guided with the lower chassis 16*a* on the lower rail system 20*a* and with the upper chassis 16*b* on the upper rail system 20*b*, it would also be possible for the rack servicing machine to be guided merely with the lower chassis 16*a* on the lower rail system 20*a*. In this case, the upper chassis 16*b* and the upper rail system 20*b* are unnecessary.

As is evident in FIG. 2, the receiving platform 17 is mounted on the vertical mast 15 in a manner that it can be adjusted in height in y-direction via the lifting drive 18. The lifting drive is formed by a traction drive and at least one electrical drive motor coupled with it. A single piece goods 5 or else several piece goods 5 may be transported on the receiving platform 17.

The conveyor vehicle 4 is equipped with at least one transport device 31, by means of which the piece goods 5 are stored on the storage locations 6 or the piece goods 5 are retrieved from the storage locations 6. The transport device 31 may comprise telescoping units 32 that can be extended in a transverse direction (z-direction) from a starting position synchronously in both directions, so that the storage racks 2 disposed on both sides of the conveyor vehicle 4 may be serviced.

In FIGS. 3 to 10, a first embodiment of the rail system is shown, especially the lower rail system 20*a*, wherein fastening devices 63 to be described in still more detail are illustrated exclusively in 3 and 4.

The rail system 20*a* comprises a first running rail 33*a*, a second running rail 33*b* and a connecting device 34. The connecting device 34 has at least one interlocking connection between the ends 35*a*, 35*b*, directed toward one another, of the first running rail 33*a* and second running rail 33*b*. At its end 35*a*, the first running rail 33*a* forms a first interlocking element 36*a* and a first surface portion 37*a*. The first surface portion 37*a* is shown in shaded manner in FIG. 8. The end 35*a* extends in a cross-sectional plane perpendicular to the longitudinal extent of the first running rail 33*a*. At its end 35*b*, the second running rail 33*b* forms a second interlocking element 36*b* and a second surface portion 37*b*. The second surface portion 37*b* is shown in shaded manner in FIG. 9. The end 35*b* extends in a cross-sectional plane perpendicular to the longitudinal extent of the second running rail 33*b*.

The first running rail 33*a* and second running rail 33*b* form at least one guide track, which extends in longitudinal direction of the rail system 20*a* and along which one or more running wheels 22 (the running wheel corresponds to the drive wheel); 24*a*, 24*b*; 26*a*, 26*b*; 28 of the conveyor vehicle 4 bear in rolling relationship.

Figure 3:
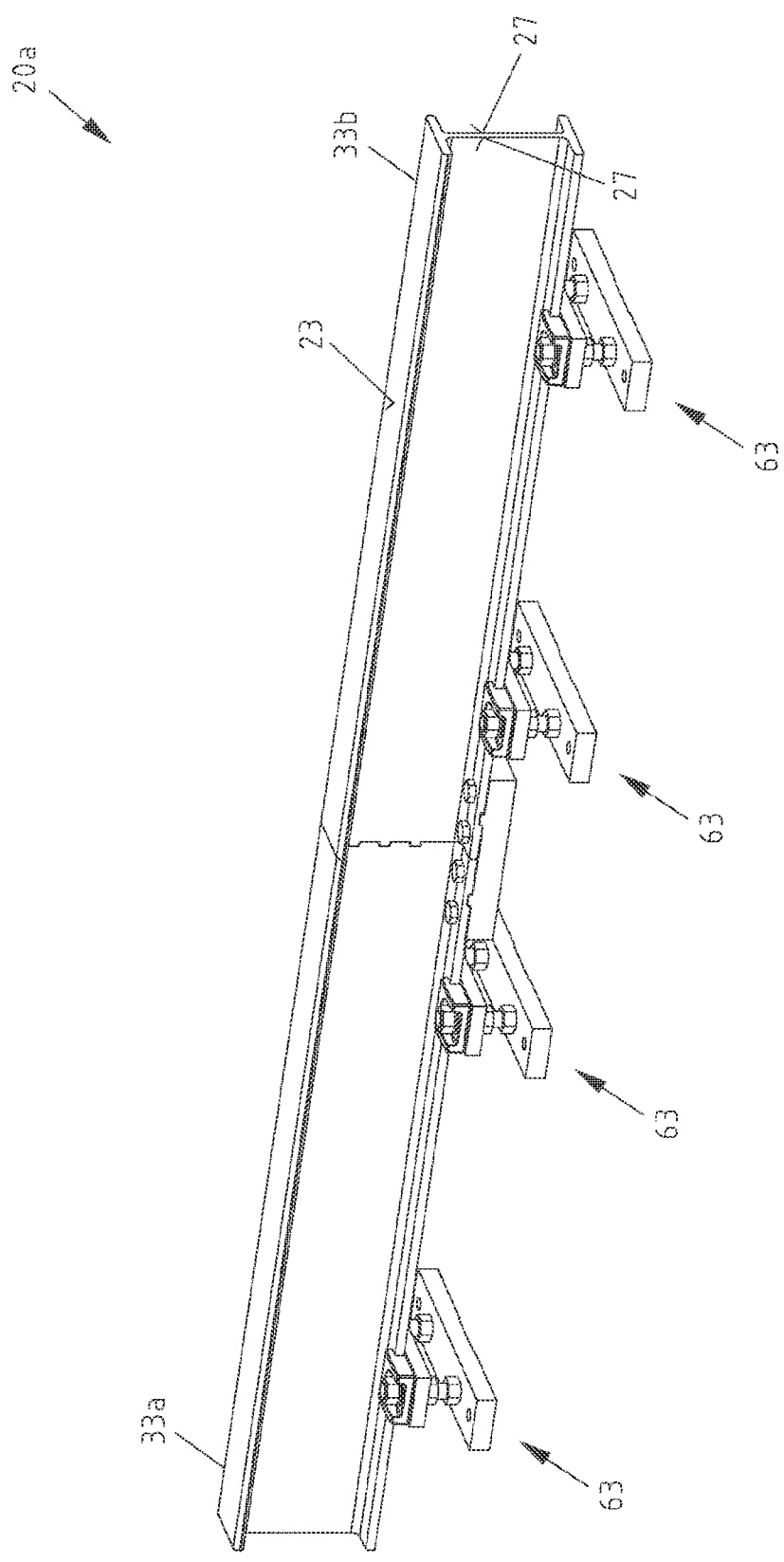
FIG. 3 shows a first embodiment of a rail system for the conveyor vehicle and fastening devices for the rail system in a perspective view.

As described in the following, an upper flange 41 of the first running rail 33a and an upper flange 41 of the second running rail 33b may be formed, for example, with the guide track, especially the first guide track 23, as shown in FIG. 3. This first guide track 23 is disposed on the upper side of the upper flange 41.

Figure 4:
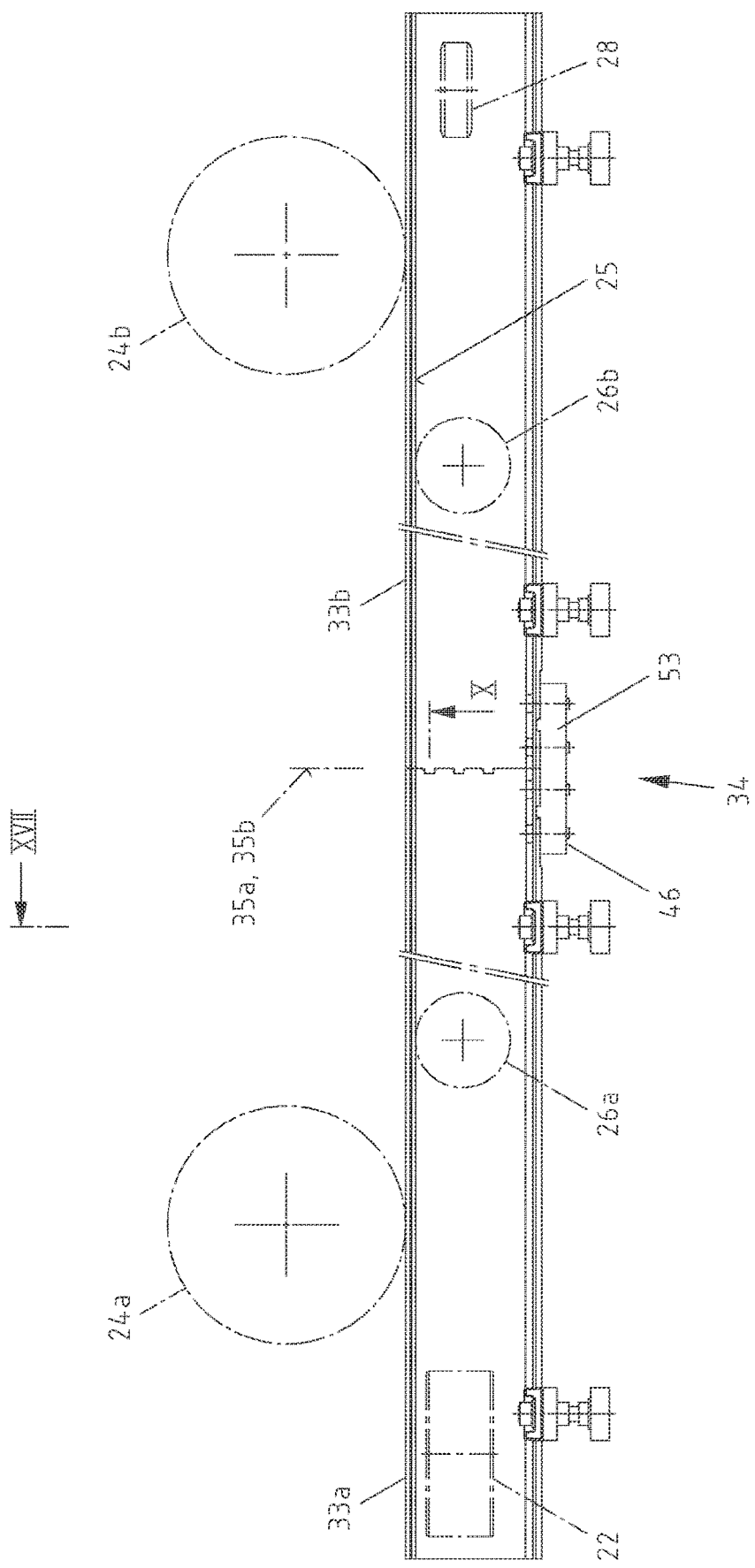
FIG. 4 shows a side view of the rail system having the running-rail portions, the fastening devices and the schematically indicated running wheels of the conveyor vehicle.
Figure 5:
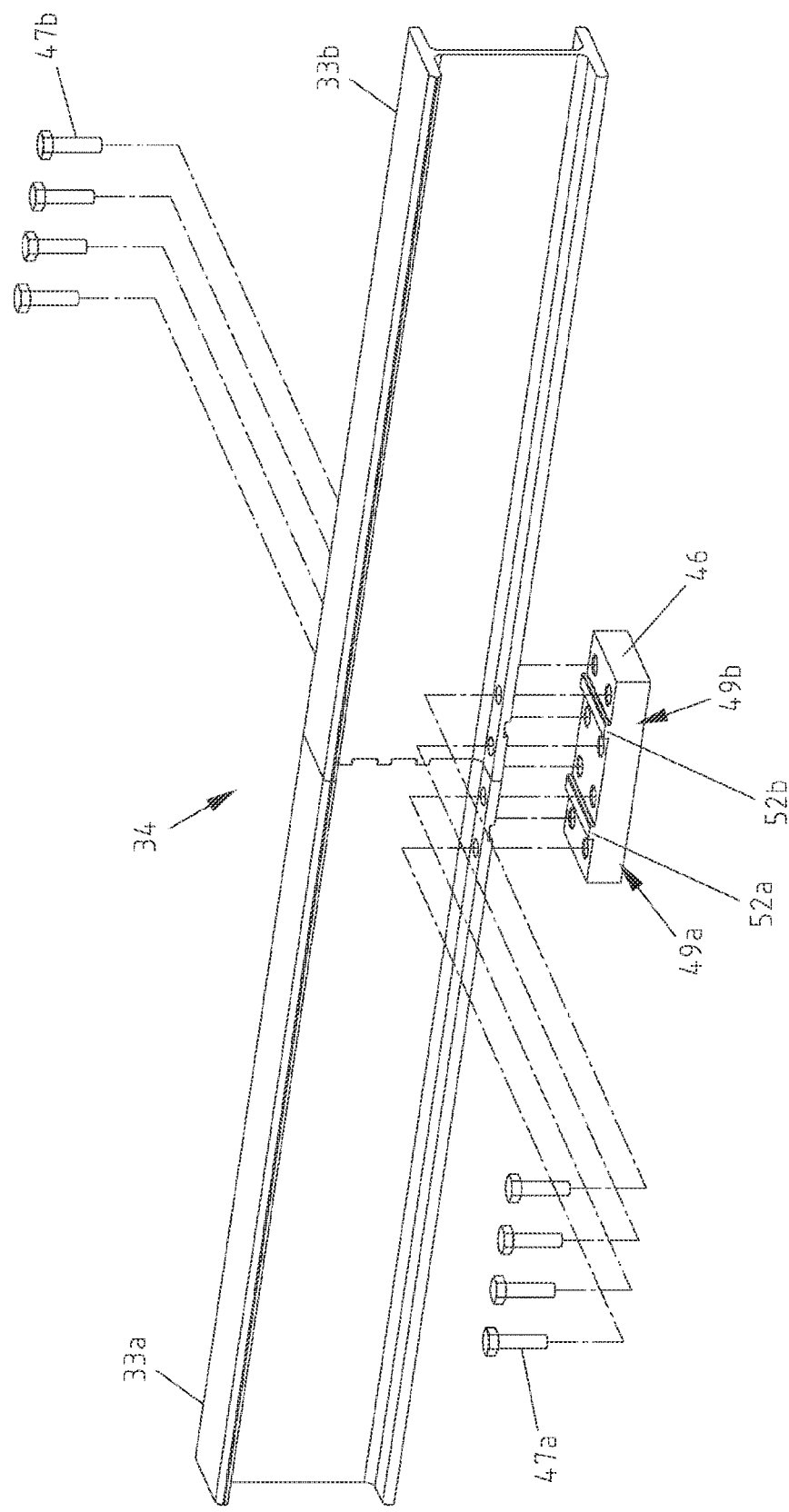
FIG. 5 shows a first embodiment of a connecting device for the running rails, for example of the rail system according to FIG. 3, in an exploded diagram.

It is also possible that an upper flange 41 of the first running rail 33a and an upper flange 41 of the second running rail 33b forms the guide track, especially the second guide track 25, as shown in FIG. 4. This second guide track 25 is disposed on the underside of the upper flange 41. The first running rail 33a and second running rail 33b may form both the first guide track 23 and the second guide track 25. Thus the first guide track 23 and second guide track 25 are different guide tracks.

As described in the following, a vertical web 42 of the first running rail 33a and vertical web 42 of the second running rail 33b may be formed, for example, with the guide track, especially the third guide track 27, as shown in FIGS. 8, 9. Preferably, the vertical web 42 is equipped with third guide tracks 27 lying opposite one another.

As is apparent in the figures, the first surface portion 37a extends in a cross-sectional plane perpendicular to the first running rail 33a and the second surface portion 37b extends in a cross-sectional plane perpendicular to the second running rail 33b. The first surface portion 37a and the second surface portion 37b respectively adjoin the at least one guide track.

The first interlocking element 36a and second interlocking element 36b are formed and disposed in such a way that they engage in one another in complementary manner and the ends 35a, 35b of the first running rail 33a and second running rail 33b bear on one another abuttingly with the surface portions 37a, 37b, when the first running rail 33a and second running rail 33b are positioned toward one another. A substantially gap-free transition is formed on the at least one guide track, especially the first guide track 23 and/or the second guide track 25 and/or at least in surface portions of the third guide track(s) 27 between the first running rail 33a and second running rail 33b. The term "gap-free transition" is to be understood to mean that the gap size between the surface portions 37a, 37b in the region of the first guide track 23 and/or second guide track 25 amounts to at most 0.2 mm.

The first interlocking element 36a may comprise more than one positioning opening 38 disposed in recessed manner in the end 35a, for example six positioning openings 38. The second interlocking element 36b may comprise more than one positioning projection 39 protruding perpendicularly at the end 35b, for example six positioning projections 39.

According to the shown embodiment, the running rails 33a, 33b respectively form a lower flange 40, an upper flange 41 and a vertical web 42 connecting these.

As is apparent from the figures, the first interlocking element 36a is formed on the vertical web 42 of the first running rail 33a and the second interlocking element 36b is formed on the vertical web 42 of the second running rail 33b. The first surface portion 37a adjoins the first interlocking element 36a, especially the positioning openings 38, and extends into the lower flange 40 and upper flange 41. The second surface portion 37b adjoins the second interlocking element 36b, especially the positioning projections 39, and extends into the lower flange 40 and upper flange 41. In an advantageous embodiment, the first interlocking element 36a/second interlocking element 36b is not provided on the lower flange 40 and upper flange 41.

The positioning openings 38 extend respectively with a depth parallel to a longitudinal axis of the first running rail 33a and are oriented alternately in opposite direction and disposed offset from one another and adjoin the third guide tracks 27 turned away from one another. As can also be seen in FIGS. 5 and 6, material webs, which form a sub-portion of the third guide tracks 27, remain between the positioning openings 38.

The positioning projections 39 extend respectively with a length parallel to a longitudinal axis of the second running rail 33b and are oriented alternately in opposite direction and disposed offset from one another and adjoin the third guide tracks 27 turned away from one another. As can also be seen in FIGS. 5 and 6, the positioning projections 39 form a sub-portion of the third guide tracks 27.

The positioning openings 38 have a smaller width compared with the width of the vertical web 42. The positioning projections 39 have a smaller width compared with the width of the vertical web 42.

Figure 6:
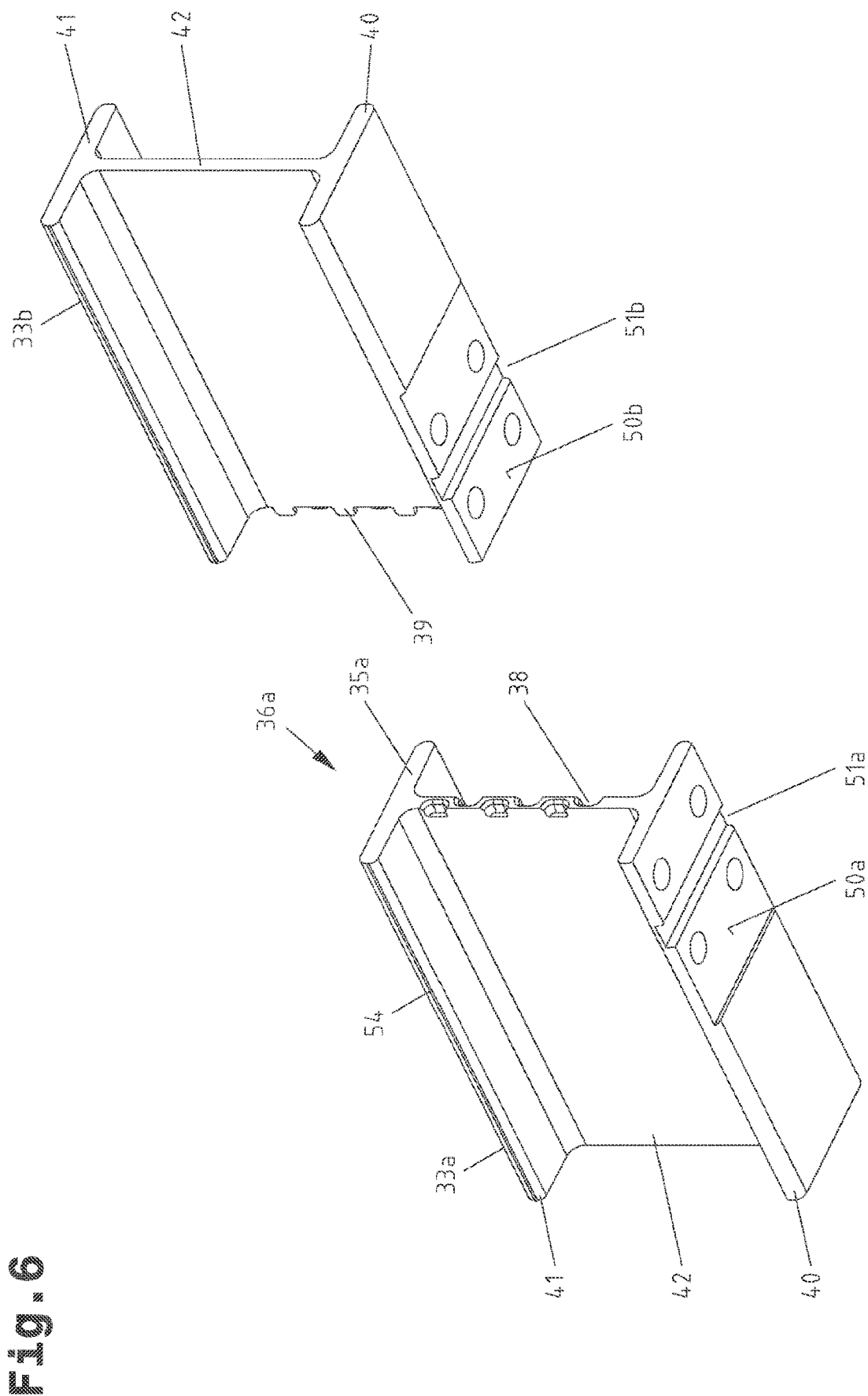
FIG. 6 shows the running rails of the rail system in a perspective view and a view of the end of the first running rail.
Figure 7:
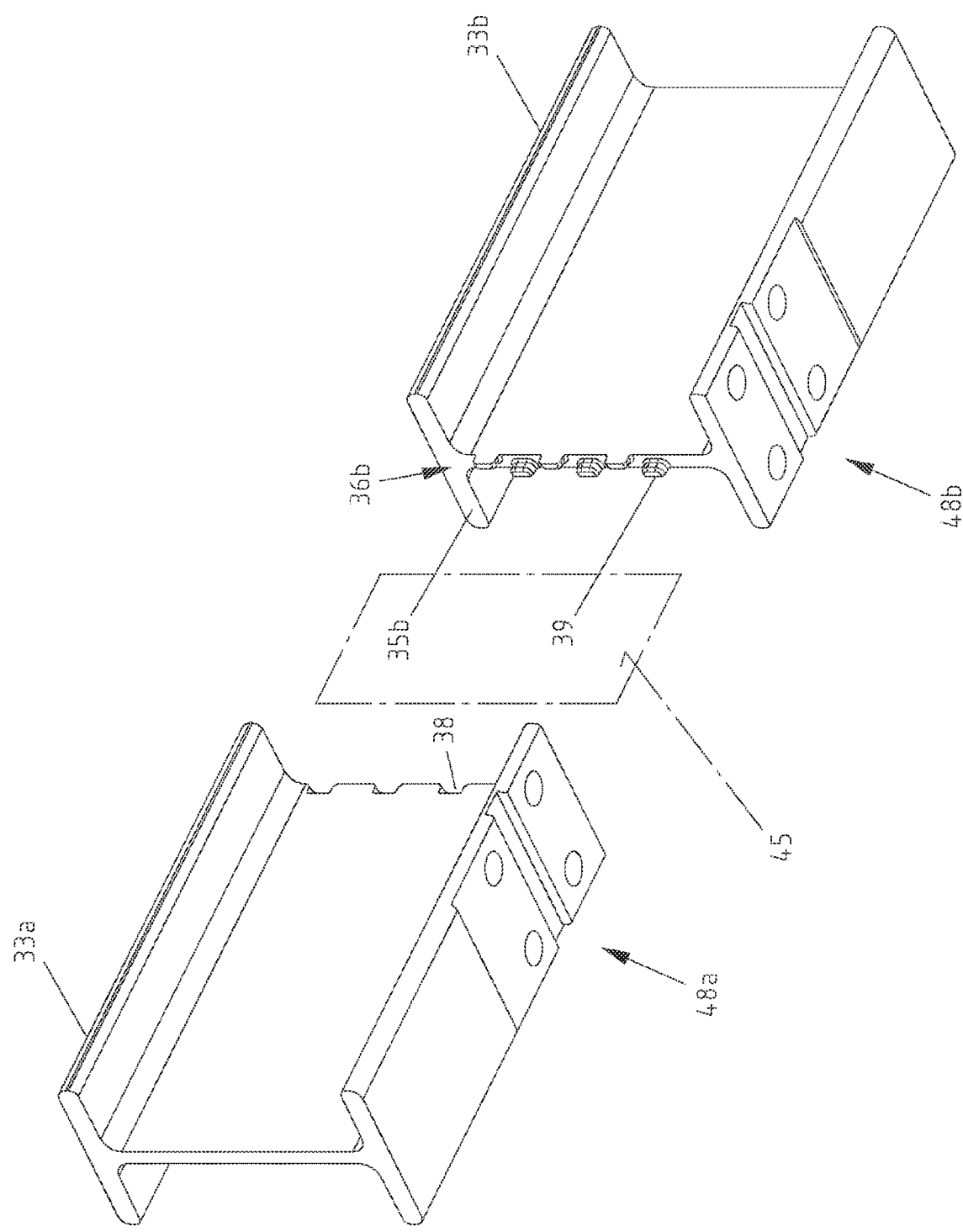
FIG. 7 shows the running rails of the rail system in a perspective view and a view of the end of the second running rail.

If the ends 35a, 35b are aligned toward one another, the positioning openings 38 and positioning projections 39 are able to engage alternatingly in one another, as shown in FIG. 6.

As can be seen in FIG. 10, the positioning projections 39 are shorter than the positioning openings 38 are deep, so that the surface portions 37a, 37b can be placed abuttingly against one another. The width 43a of the positioning openings 38 and the width 43b of the positioning projections 39 are matched to one another in such a way that these or contact faces turned toward one another in the cross-sectional plane perpendicular to the longitudinal axis 44 of the running rails 33a, 33b engage in substantially gap-free manner, and the third guide tracks 27 lying opposite one another extend seamlessly when the running rails 33a, 33b are connected to one another. It is of advantage that the first interlocking element 36a and the second interlocking element 36b are used for positioning and connecting.

In other words, the running rails 33a, 33b are braced against one another via the positioning openings 38 and positioning projections 39 engaging in one another and via the surface portions 37a, 37b, so that the running rails 33a, 33b are positioned toward one another in the direction of the longitudinal axis 44 of the rail system 20a and in a direction perpendicular to a longitudinal plane 45 of the rail system 20a. The longitudinal plane 45 extends in the direction of the longitudinal axis 44 of the rail system 20a and parallel to the third guide track 27. In contrast, the running rails 33a, 33b are able to move in a direction perpendicular to the first guide track 23 with little gap relative to one another.

The running rails 33a, 33b may be additionally connected to one another via an arrangement for fixation of a relative location between the first running rail 33a and second running rail 33b. According to the shown embodiment (see FIGS. 4 and 5), the connecting device 34 or arrangement has a connecting beam 46, which is connected via a first fixation means 47a to an end region of the first running rail 33a and via a second fixation means 47b to an end region of the second running rail 33b. In this way, a relative movement between the running rails 33a, 33b is prevented. Via the connecting beam 46, the running rails 33a, 33b may be positioned relative to one another in a direction perpendicular to the first guide track 23.

According to the shown embodiment, the first running rail 33a is equipped on the lower flange 40 close to the end 35a with a first interlocking element 48a and the second running rail 33b is equipped on the lower flange 40 close to the end 35b with a second interlocking element 48b. Likewise the connecting beam 46 is equipped with a first interlocking element 49a and a second interlocking element 49b, wherein respectively the first interlocking elements 48a, 49a and respectively the second interlocking elements 48b, 49b engage in one another in complementary manner.

The first interlocking element 48a comprises, for example, a positioning seat 51a disposed in recessed manner in a mounting face 50a on the first running rail 33a. The interlocking element 49a comprises, for example, a first positioning projection 52a protruding perpendicularly on a baseplate 53 on the connecting beam 46.

The second interlocking element 48b comprises, for example, a positioning seat 51b disposed in recessed manner in a mounting face 50b on the second running rail 33b. The interlocking element 49b comprises, for example, a second positioning projection 52b protruding perpendicularly on a baseplate 53 on the connecting beam 46.

If the ends 35a, 35b are aligned toward one another and if the connecting beam 46 is placed with the baseplate 53 against the mounting faces 50a, 50b, respectively the first interlocking element 48a, 49a and respectively the second interlocking elements 48b, 49b engage in one another in complementary manner. The running rails 33a, 33b are coupled via the connecting beam 46 and fixed to one another via the fixation means 47a, 47b.

The positioning seats 51a, 51b and positioning projections 52a, 52b are positioned at a longitudinal spacing from one another, wherein the longitudinal spacing is dimensioned such that the surface portions 37a, 37b bear abuttingly on one another.

At this place it must also be pointed out that the first interlocking elements 48a, 49a and the second interlocking elements 48b, 49b are not absolutely necessary. Instead of these, it is also possible that only the fixation means 47a, 47b, for example tightening screws, are provided. In this case, the connecting beam 46 is provided only with the baseplate 53.

It is of advantage that the first running rail 33a and second running rail 33b can be connected detachably with one another via the connecting device 34. The connecting device 34 is simply constructed and the rail-joint connection can be made rapidly on the construction site. Mounting errors can be ruled out almost completely. Also, it is possible to dispense with an extensive quality inspection of the rail-joint connection, as is necessary for conventional welded connections.

As follows from the descriptions, the arrangement for fixation of a relative location between the first running rail 33a and second running rail 33b is formed by the connecting beam 46 and the fixation means 47a, 47b or by the connecting beam 46, the interlocking elements 48a, 49a, 48b, 49b and the fixation means 47a, 47b.

Figure 12:
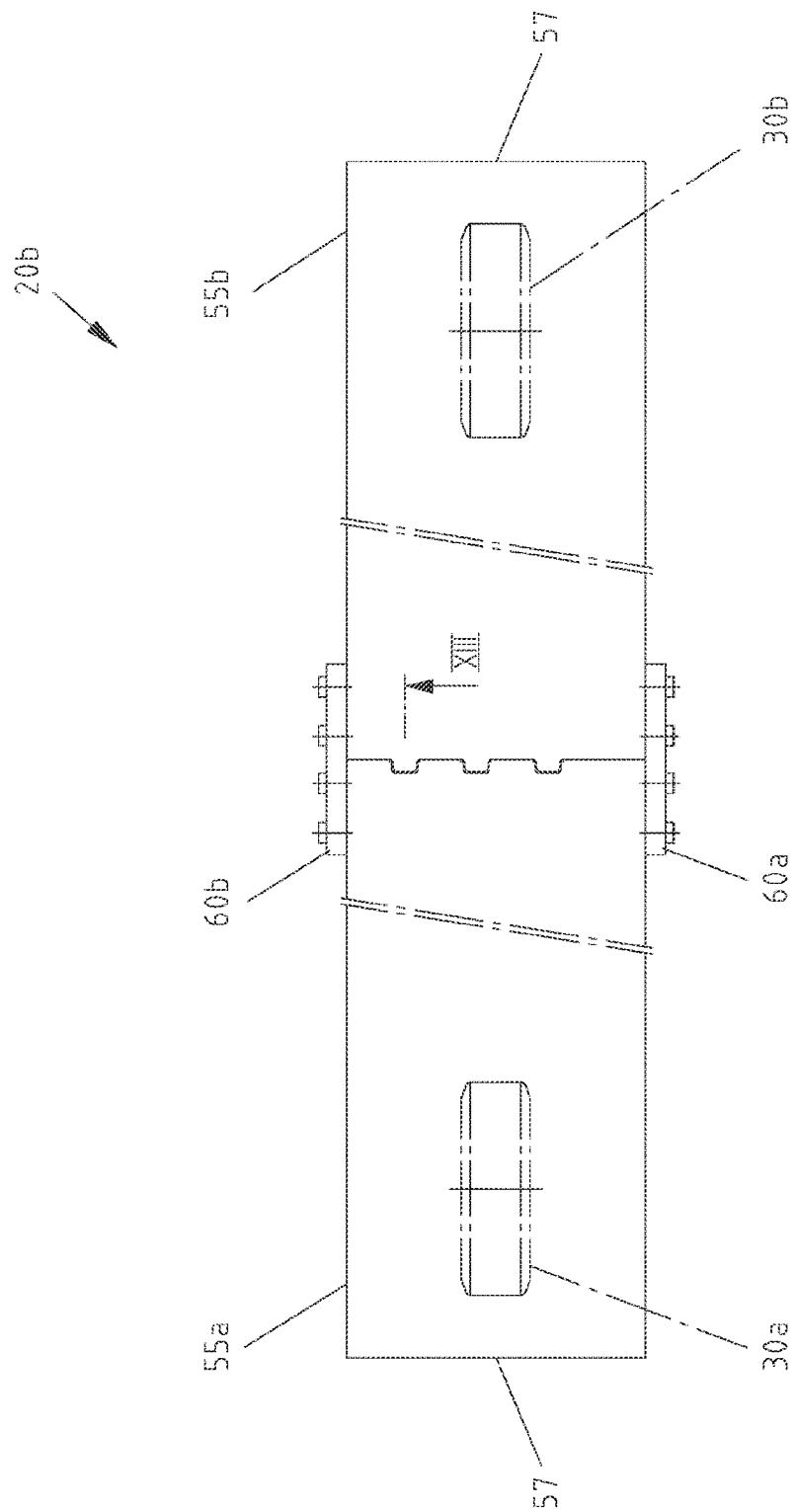
FIG. 12 shows a side view of the rail system according to the embodiment in FIG. 11 and having interlocking elements engaging in one another.

In FIGS. 11 to 13, described together, a second embodiment of a rail system, especially the upper rail system 20b, which uses a similarly designed connecting device 56, is described in more detail.

The upper rail system 20b comprises a first running rail 55a, a second running rail 55b and a connecting device 56. The first running rail 55a and second running rail 55b form at least one guide track, which extends in longitudinal direction of the rail system 20b and along which one or more running wheels 30a, 30b of the conveyor vehicle 4 bear in rolling relationship. According to the shown embodiment, the running rails 55a, 55b are respectively formed by a flat profile 57, which has guide tracks 58 lying opposite one another.

As is apparent in the figures, the first surface portion 37a extends in a cross-sectional plane perpendicular to the first running rail 55a and the second surface portion 37b extends in a cross-sectional plane perpendicular to the second running rail 55b. The first surface portion 37a and the second surface portion 37b respectively adjoin the at least one guide track.

The connecting device 56 has at least one interlocking connection between the ends 59a, 59b, directed toward one another, of the first running rail 55a and second running rail 55b. At its end 59a, the first running rail 55a forms a first interlocking element 36a and a first surface portion 37a. The end 59a extends in a cross-sectional plane perpendicular to the longitudinal extent of the first running rail 55a. At its end 59b, the second running rail 55b forms a second interlocking element 36b and a second surface portion 37b. The end 59b extends in a cross-sectional plane perpendicular to the longitudinal extent of the first running rail 55b. The first interlocking element 36a and second interlocking element 36b are formed and disposed in such a way that they engage in one another in complementary manner and the ends 55a, 55b of the first running rail 55a and second running rail 55b bear on one another abuttingly with the surface portions 37a, 37b. A substantially gap-free transition is formed on the at least one guide track, especially at least in surface portions of the guide track(s) 58 between the first running rail 55a and second running rail 55b. The first interlocking element 36a is formed by at least one positioning opening 38 disposed in recessed manner in the end 59a. The second interlocking element 36b is formed by at least one positioning projection 39 protruding perpendicularly at the end 59b.

The first interlocking element 36a may comprise more than one positioning opening 38 disposed in recessed manner in the end 59a, for example six positioning openings 38. The second interlocking element 36b may comprise more than one positioning projection 39 protruding perpendicularly at the end 59b, for example six positioning projections 39.

As is apparent from the figures, the first surface portion 37a adjoins the first interlocking element 36a, especially the positioning openings 38, and extends to the rims of the flat profile 57. The second surface portion 37b adjoins the second interlocking element 36b, especially the positioning projections 39, and extends to the rims of the flat profile 57.

The positioning openings 38 extend respectively with a depth parallel to a longitudinal axis of the first running rail 55a and are oriented alternately in opposite direction and disposed offset from one another and adjoin the guide tracks 58 turned away from one another. As can also be seen in FIG. 11, material webs, which form a sub-portion of the guide tracks 58, remain between the positioning openings 38.

The positioning projections 39 extend respectively with a length parallel to a longitudinal axis of the second running rail 55b and are oriented alternately in opposite direction and disposed offset from one another and adjoin the guide tracks 58 turned away from one another. As can also be seen in FIGS. 11 and 13, the positioning projections 39 form a sub-portion of the guide tracks 58.

The positioning openings 38 have a smaller width compared with the width of the flat profile 57. The positioning projections 39 have a smaller width compared with the width of the flat profile 57.

If the ends 35a, 35b are aligned toward one another, the positioning openings 38 and positioning projections 39 are able to engage alternatingly in one another, as shown in FIG. 12. As can also be seen, the positioning projections 39 are shorter than the positioning openings 38 are deep, so that the surface portions 37a, 37b can be placed abuttingly against one another. The width 43a of the positioning openings 38 and the width 43b of the positioning projections 39 are matched to one another in such a way that these or contact faces turned toward one another in the cross-sectional plane perpendicular to the longitudinal axis of the running rails 55a, 55b engage in substantially gap-free manner, and the guide tracks 58 lying opposite one another extend seamlessly when the running rails 55a, 55b are connected to one another (see FIG. 13). It is of advantage that the first interlocking element 36a and the second interlocking element 36b are used for positioning and connecting.

In other words, the running rails 55a, 55b are braced against one another via the positioning openings 38 and positioning projections 39 engaging in one another and via the surface portions 37a, 37b, so that the running rails 55a, 55b are positioned toward one another in the direction of the longitudinal axis 44 of the rail system 20b and in a direction perpendicular to a longitudinal plane 45 (not shown) of the rail system 20b. The longitudinal plane extends in the direction of the longitudinal axis 44 of the rail system 20b and parallel to the guide tracks 58. In contrast, the running rails 55a, 55b are able to move in a direction parallel to the guide tracks 58 with little gap relative to one another.

The running rails 55a, 55b may be additionally connected to one another via an arrangement for fixation of a relative location between the first running rail 55a and second running rail 55b.

According to the shown embodiment, the connecting device 56 or the arrangement has a lower connecting beam 60a and upper connecting beam 60b, which are respectively connected via a first fixation means 47a to an end region of the first running rail 55a and via a second fixation means 47b to an end region of the second running rail 55b. The fixation means 47a, 47b are screws, for example, or a combination of dowel pins and screws. In this way, a relative movement between the running rails 55a, 55b is prevented. Via the connecting beams 60a, 60b, the running rails 55a, 55b may be positioned relative to one another in a direction parallel to the guide tracks 58.

If the ends 59a, 59b are aligned toward one another and if the connecting beams 60a, 60b are placed against the mounting faces 61a, 61b lying opposite one another, the first interlocking elements 36a, 36b engage in one another in complementary manner. The running rails 55a, 55b are coupled via the connecting beams 60a, 60b and fixed to one another via the fixation means 47a, 47b.

At this place it must also be pointed out that the upper connecting beams 60b are not absolutely necessary. It is of advantage that the first running rail 55a and second running rail 55b can be connected detachably with one another via the connecting device 56.

As follows from the description, the arrangement for fixation of a relative location between the first running rail 55a and second running rail 55b is formed by the connecting beam 60a and the fixation means 47a, 47b or by the connecting beams 60a, 60b and the fixation means 47a, 47b.

Figure 14:
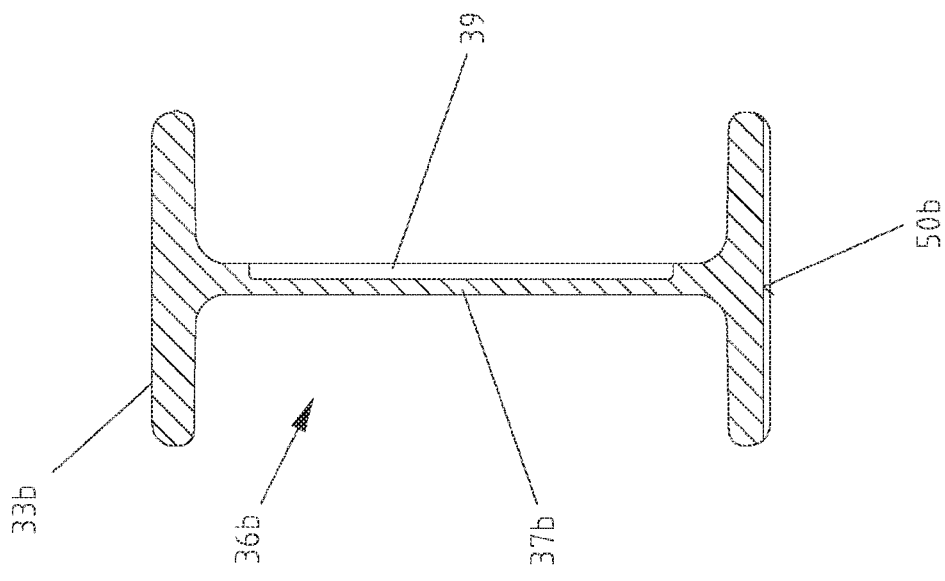
FIG. 14 shows an end view of a first running rail of a third embodiment of a connecting device.
Figure 15:
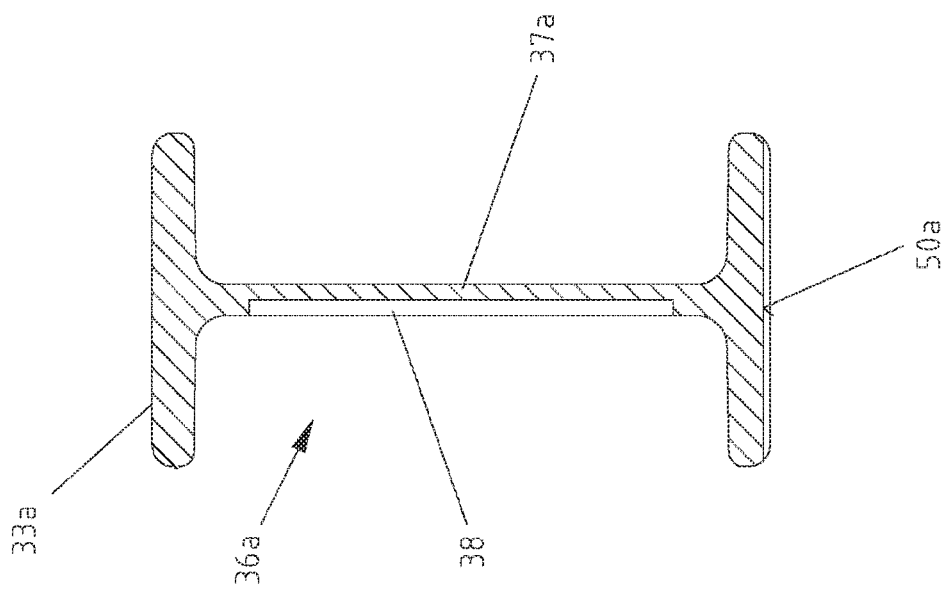
FIG. 15 shows an end view of a second running rail of a third embodiment of a connecting device.
Figure 18:
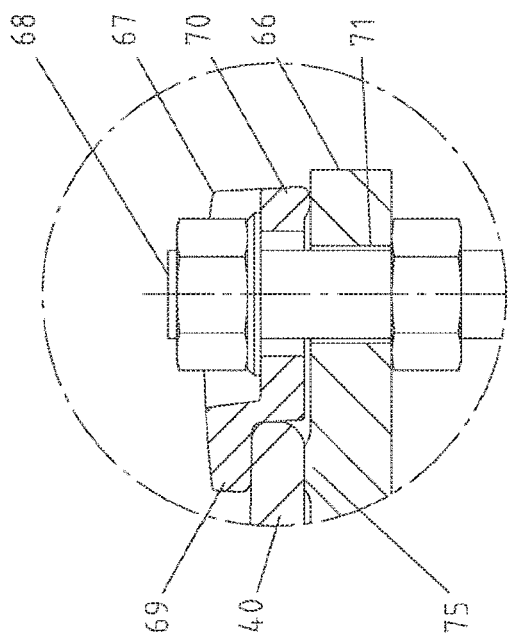
FIG. 18 shows a enlargement of a detail from FIG. 17.

In FIGS. 14 to 16, an embodiment of a connecting device 62 is shown that comprises an interlocking connection between the ends 35a, 35b, directed toward one another, of the first running rail 33a and second running rail 33b. At its end 35a, the first running rail 33a forms a first interlocking element 36a and a first surface portion 37a. The end 35a extends in a cross-sectional plane perpendicular to the longitudinal extent of the first running rail 33a. At its end 35b, the second running rail 33b forms a second interlocking element 36b and a second surface portion 37b. The end 35b extends in a cross-sectional plane perpendicular to the longitudinal extent of the first running rail 33b. The first interlocking element 36a and second interlocking element 36b are formed and disposed in such a way that they engage in one another in complementary manner and the ends 35a, 35b of the first running rail 33a and second running rail 33b bear on one another abuttingly with the surface portions 37a, 37b. In contrast to the embodiment according to FIGS. 3 to 10, the first interlocking element 36a is formed by one (single) positioning opening 38 disposed in recessed manner in the end 35a. The second interlocking element 36b is formed by one (single) positioning projection 39 protruding perpendicularly at the end 35b.

As is apparent from the figures, the first interlocking element 36a is formed on the vertical web 42 of the first running rail 33a and the second interlocking element 36b is formed on the vertical web 42 of the second running rail 33b. The first surface portion 37a adjoins the first interlocking element 36a, especially the positioning opening 38, and extends into the lower flange 40 and upper flange 41. The second surface portion 37b adjoins the second interlocking element 36b, especially the positioning projection 39, and extends into the lower flange 40 and upper flange 41. In an advantageous embodiment, the first interlocking element 36a/second interlocking element 36b is not provided on the lower flange 40 and upper flange 41.

The positioning opening 38 extends with a depth parallel to a longitudinal axis of the first running rail 33a and adjoins the third guide tracks 27 turned away from one another. The positioning projection 39 extends with a length parallel to a longitudinal axis of the second running rail 33b and adjoins the third guide tracks 27 turned away from one another. The positioning projection 39 forms a sub-portion of the third guide track 27. The positioning opening 38 has a smaller width compared with the width of the vertical web 42. The positioning projection 39 has a smaller width compared with the width of the vertical web 42.

If the ends 35a, 35b are aligned toward one another, the positioning opening 38 and positioning projection 39 are able to engage in one another, as shown in FIG. 16. As can also be seen, the positioning projection 39 is shorter than the positioning opening 38 is deep, so that the surface portions 37a, 37b can be placed abuttingly against one another. The width 43a of the positioning opening 38 and the width 43b of the positioning projection 39 are matched to one another in such a way that these or contact faces turned toward one another in the cross-sectional plane perpendicular to the longitudinal axis 44 of the running rails 33a, 33b engage in substantially gap-free manner, and the third guide tracks 27 lying opposite one another extend seamlessly when the running rails 33a, 33b are connected to one another (see FIG. 16). It is of advantage that the first interlocking element 36a and the second interlocking element 36b are used for positioning and connecting.

The running rails 33a, 33b may be additionally connected to one another via an arrangement for fixation of a relative location between the first running rail 33a and second running rail 33b. According to the shown embodiment, the connecting device 62 is provided with the connecting beam 46 described in the foregoing, not illustrated in these figures. Via the connecting beam 46, the running rails 33a, 33b may be positioned relative to one another in a direction perpendicular to the first guide track 23.

The described embodiment of the connecting device 62 may naturally be used on the rail system 20b also.

In FIG. 3, a detail is shown of the rail system 20*a* and some fastening devices 63 disposed in distributed manner over the rail length. The rail system 20*a* is mounted via the fastening devices 63 on an adjacent building part (illustrated exclusively in FIG. 17), for example a rail-bracing plate 64 anchored on a floor. The rail-bracing plate 64 is anchored on the adjacent building part via adhesive anchors 74 (shown exclusively in FIG. 17), for example.

Figure 17:
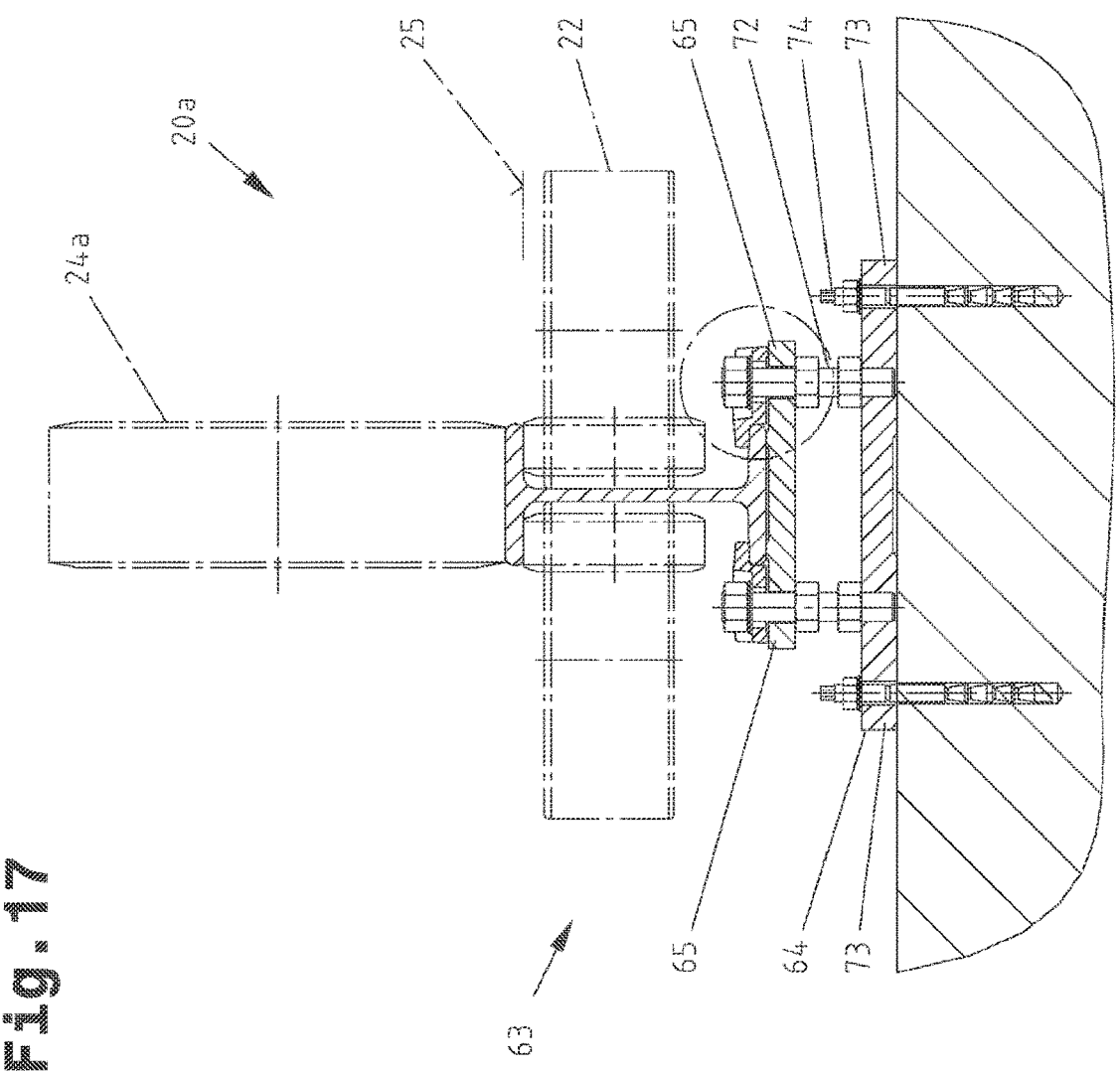
FIG. 17 shows a sectional diagram through the fastening device according to the line XVII-XVII in FIG. 4.

The fastening device 63, as illustrated in more detail in FIG. 17, comprises a carrier plate 66 disposed underneath the rail system 20*a* and protruding with mounting portions 65 on both sides of the rail system 20*a*, as well as a clamping unit for mounting of the rail system 20*a* on the carrier plate 66.

The carrier plate 66 is preferably equipped between the mounting portions 65 with supports 75, which extend with mutual spacings parallel to the longitudinal direction of the rail system 20*a* and which respectively form a support face, on which the rail system 20*a* is braced.

The clamping unit is provided with clamping plates 67 disposed on both sides of the rail system 20*a* and with one tightening means 68 per clamping plate 67. The clamping plates 67 respectively comprise a tightening portion 69 bearing with a pressing force against the lower flange 40 and a bracing portion 70 lying on the carrier plate 66 in the mounting portion 65 and a through-opening 71 for receiving the tightening means 68. The tightening means 68 are anchored on the mounting portions 65.

It also proves to be of advantage when a lubricant (not illustrated) is additionally provided between the support faces on the tightening portion 69 and on the lower flange 40 and/or between the support faces on the supports 75 and on the lower flange 40. The lubricant is formed, for example, from a lubricating layer. Preferably, a lubricating paste is used as the lubricant (glide agent). It is possible to influence the loads acting on the fastening device 63 favorably by different longitudinal expansion characteristics between the adjacent building part, for example the floor, and the rail system 20*a*. In particular, a reproducible frictional connection between the tightening portion 69 and lower flange 40 or between the supports 75 and the lower flange 40 can be created over a long useful life.

By means of the height-adjusting device 72, for example spacer screws, the rail system 20*a* may be adjusted in height so that an exact height setting is possible regardless of floor irregularities even over long rail lengths.

As is apparent in FIG. 17, it also proves to be of advantage when the rail-bracing plate 64 is provided on its inner side turned toward the adjacent building part with support projections 73, which are braced against the adjacent building part.

Finally, it must also be mentioned that the running rails 33*a*, 33*b*; 55*a*, 55*b* are preferably made by the forming method, especially rolling or extrusion pressing and by cropping to a standard length (for example, six meters). It proves to be favorable when the running-rail profile is equipped during the forming process with a marking 54 (FIG. 6), so that, after the cropping of the running-rail profile to several pieces of individual running rails 33*a*, 33*b*; 55*a*, 55*b*, an unmistakable alignment of the running rails 33*a*, 33*b*; 55*a*, 55*b* (configured with mirror symmetry) is possible.

It must also be mentioned that it is possible in principle for the connecting device 34; 56; 62 to have no connecting beams 46; 60*a*; 60*b* and for the arrangement for fixation of a relative location between the first running rail 33*a* and second running rail 33*b* to be formed by the fastening devices 63. In this connection, the first running rail 33*a*; 55*a* is fixed or clamped close to the end 35*a*, 59*a* with at least one first fastening device 63 and the second running rail 33*b*; 55*b* is fixed or clamped close to the end 35*b*; 59*b* with at least one second fastening device 63. Via the clamping plates 67 described in the foregoing, the first running rail 33*a*; 55*a* is tightened close to the end 35*a*; 59*a* with a pressing force against a first carrier plate 66 and, via the clamping plates 67 described in the foregoing, the second running rail 33*b*; 55*b* is tightened close to the end 35*b*; 59*b* with a pressing force against a second carrier plate 66. In this situation, the preload force is designed such that, even during dynamic travel movements of the conveyor vehicle 4, the ends 35*a*, 35*b*; 59*a*, 59*b* do not move apart from one another in longitudinal direction of the rail system 20*a*; 20*b* but instead bear abuttingly against one another.

The exemplary embodiments show possible embodiment variants of the rail system 20*a*; 20*b*, wherein it must be noted at this place that the invention is not restricted to the specially illustrated embodiment variants of the same (singular) or the same (plural), but to the contrary diverse combinations of the individual embodiment variants with one another are also possible and, on the basis of the teaching of the technical handling by the subject invention, this variation possibility lies within the know-how of the person skilled in the art and active in this technical field. Thus all conceivable embodiment variants that are possible by combinations of individual details of the illustrated and described embodiment variants are also encompassed by the scope of protection.

Finally, it must be pointed out as a matter of form, for better understanding of the structure of the rail system 20*a*; 20*b*, this or its component parts have sometimes been illustrated not to scale and/or magnified and/or reduced.

LIST OF REFERENCE NUMERALS

1 Warehouse system
2 Storage rack
3 Rack aisle
4 Conveyor vehicle
5 Piece goods
6 Storage location
7 Conveyor device
8 Conveyor device
9 Rack upright
10 Rack upright
11 Longitudinal traverse
12 Longitudinal traverse
13 Crossbeam
14 Storage level
15 Mast
16 Chassis
17 Receiving platform
18 Lifting drive
19 Traveling drive
20 Rail system
21 Traveling frame
22 Drive wheel
23 Guide track
24 Running wheel
25 Guide track
26 Running wheel
27 Guide track
28 Running wheel
29 Traveling frame
30 Running wheel 31 Transport device
32 Telescoping unit
33 Running rail
34 Connecting device
35 End
36 Interlocking element
37 Surface portion
38 Positioning opening
39 Positioning projection
40 Lower flange
41 Upper flange
42 Vertical web
43 Width
44 Longitudinal axis
45 Longitudinal plane
46 Connecting beam
47 Fixation means
48 Interlocking element
49 Interlocking element
50 Mounting face
51 Positioning seat
52 Positioning projection
53 Baseplate
54 Marking
55 Running rail
56 Connecting device
57 Flat profile
58 Guide track
59 End
60 Connecting beam
61 Mounting face
62 Connecting device
63 Fastening device
64 Rail-bracing plate
65 Mounting portion
66 Carrier plate
67 Clamping plate
68 Tightening means
69 Tightening portion
70 Bracing portion
71 Through-opening
72 Height-adjusting device
73 Support projection
74 Adhesive anchor
75 Support

The invention claimed is:

1. A rail system (20a; 20b) for a conveyor vehicle (4) capable of traveling along the rail system (20a; 20b) for storage of piece goods (5) into a storage rack (2) or retrieval of piece goods (5) from a storage rack (2), comprising
a first running rail (33a; 55a),
a second running rail (33b; 55b),
a connecting device (34; 56; 62), which comprises a positive locking connection between the ends (35a, 35b; 59a, 59b) of the first running rail (33a; 55a) and the second running rail (33b; 55b) that are directed towards one another,
at least one guide track (23; 25; 27) along the first running rail (33a; 55a) and second running rail (33b; 55b), on which a running wheel (22, 24a, 24b, 26a, 26b, 28) of a chassis (16a, 16b) of the conveyor vehicle (4) bears in rolling relationship, wherein
the first running rail (35a; 55a) forms a first interlocking element (36a) and a first surface portion (37a) at the end (35a; 59a) thereof,
the second running rail (33b; 55b) forms a second interlocking element (36b) and a second surface portion (37b) at the end (35b; 59b) thereof,
wherein the first interlocking element (36a) and second interlocking element (36b) engage in one another in complementary manner,
and wherein
the first surface portion (37a) extends in a cross-sectional plane perpendicular to the first running rail (33a; 55a) and the second surface portion (37b) extends in a cross-sectional plane perpendicular to the second running rail (33b; 55b), and the first surface portion (37a) and the second surface portion (37b) adjoin the at least one guide track (23; 25; 27), and
wherein
the first interlocking element (36a) is formed in one piece at the end (35a; 59a) of the first running rail (33a; 55a) and by at least one positioning opening (38), which is disposed in recessed manner in the end (35a; 59a) and which extends with a depth parallel to a longitudinal axis of the first running rail (33a; 55a), and
the second interlocking element (36b) is formed in one piece at the end (35b; 59b) of the second running rail (33b; 55b) and by at least one positioning projection (39), which protrudes perpendicularly at the end (35b; 59b) and which extends with a length parallel to a longitudinal axis of the second running rail (33b; 55b), and wherein
the first running rail (33a; 55a) and the second running rail (33b; 55b) are equipped with a guide track (27), extending in longitudinal direction of the rail system (20a; 20b), for a running wheel (22, 28) of the conveyor vehicle (4), wherein at least one of the interlocking elements (36a, 36b) adjoins the guide track (27) and forms a sub-portion of the guide track (27),
and the ends (35a, 35b; 59a, 59b) of the first running rail (33a; 55a) and second running rail (33b; 55b) abut at the surface portions (37a, 37b) in a butt-jointed manner, so that an almost gap-free transition to the at least one guide track (23; 25; 27) is formed between the first running rail (33a; 55a) and second running rail (33b; 55b).

2. The rail system according to claim 1, wherein the first running rail (33a; 55a) and the second running rail (33b; 55b) are equipped with at least one guide track (27), extending in longitudinal direction of the rail system (20a; 20b), for a running wheel (22, 28) of the conveyor vehicle (4) and wherein the first interlocking element (36a) and the second interlocking element (36b) form contact faces facing each other and in direction perpendicular to the guide track (27) are braced with the contact faces against one another.

3. The rail system according to claim 1, wherein the first running rail (33a; 55a) and second running rail (33b; 55b) respectively form a lower flange (40), an upper flange (41) and a vertical web (42) connecting these.

4. The rail system according to claim 3, wherein the first interlocking element (36a) is formed on the vertical web (42) of the first running rail (33a) and the second interlocking element (36b) is formed on the vertical web (42) of the second running rail (33b).

5. The rail system according to claim 3, wherein the first surface portion (37a) is formed on the lower flange (40) and/or upper flange (41) of the first running rail (33a).

6. The rail system according to claim 3, wherein the first surface portion (37a) is formed on the vertical web (42) and adjoins the first interlocking element (36a).

7. The rail system according to claim 3, wherein the second surface portion (37b) is formed on the lower flange (40) and/or upper flange (41) of the second running rail (33b).

8. The rail system according to claim 1, wherein the second surface portion (37b) is formed on the vertical web (42) and adjoins the second interlocking element (36b).

9. The rail system according to claim 1, wherein the connecting device (34; 56; 62) comprises an arrangement for fixation of a relative location between the first running rail (33a; 55a) and second running rail (33b; 55b).

10. The rail system according to claim 1, wherein at least one of the connecting device (34; 56; 62) and the arrangement for fixation of a relative location between the first running rail (33a; 55a) and second running rail (33b; 55b) comprises a connecting beam (46; 60a; 60b), which is connected via a first fixation means (47a) to an end region of the first running rail (33a; 55a) and via a second fixation means (47b) to an end region of the second running rail (33b; 55b).

11. The rail system according to claim 10, wherein a positive locking connection is provided between the connecting beam (46) and the first running rail (33a) and a positive locking connection is provided between the connecting beam (46) and the second running rail (33b).

12. The rail system according to claim 11, wherein the first running rail (33a) forms a first interlocking element (48a) on the lower flange (40) close to the the end (35a) and the second running rail (33b) forms a second interlocking element (48b) on the lower flange (40) close to the end (35b), and the connecting beam (46) has a first interlocking element (49a) and a second interlocking element (49b), wherein respectively the first interlocking elements (48a, 49a) and respectively the second interlocking elements (48b, 49b) engage in one another in complementary manner.

13. The rail system according to claim 1, wherein the running rails (33a, 33b; 55a, 55b) are produced in the forming method and by cutting to a standard length, and are equipped with a marking (54).

14. A warehouse system (1) having at least one storage rack (2) and a rail system (20a; 20b) extending along the storage rack (2) and a conveyor vehicle (4) for storage of piece goods (5) in the storage rack (2) or retrieval of piece goods (5) from the storage rack (2), wherein the rail system (20a; 20b) comprises a first running rail (33a; 55a) and a second running rail (33b; 55b) and forms running tracks (23; 25; 27), and wherein the conveyor vehicle (4) has a chassis (16a; 16b) with running wheels (22, 24a, 24b, 26a, 26b, 28) bearing in rolling relationship on the running tracks (23; 25; 27) and a traveling unit (19) for the drive of at least one of the running wheels (22), wherein the rail system (20a; 20b) is designed according to claim 1.

15. The warehouse system according to claim 14, wherein the rail system (20a) is mounted on rail-bracing plates (64) via fastening devices (63) disposed in distributed manner along the first running rail (33a; 55a) and second running rail (33b; 55b), wherein the rail-bracing plates (64) are anchored on an adjacent building part, and wherein the first running rail (33a; 55a) and second running rail (33b; 55b) respectively form a lower flange (40), an upper flange (41) and a vertical web (42) connecting these, and the fastening devices (63) respectively
have a carrier plate (66) disposed underneath the rail system (20a) and protruding with mounting portions (65) on both sides of the rail system (20a), and
for mounting of the rail system (20a) on the carrier plate (66), a clamping unit that comprises clamping plates (67) disposed on both sides of the rail system (20a) as well as one tightening means (68) per clamping plate (67), wherein the clamping plates (67) respectively form a tightening portion (69) bearing with a pressing force against the lower flange (40) and a bracing portion (70) lying on the carrier plate (66) in the mounting portion (65) and a through-opening (71) for accommodation of the tightening means (68), and the tightening means (68) are anchored on the mounting portions (65).

16. The warehouse system according to claim 15, wherein the carrier plate (66) on the mounting portions (65) is mounted on the rail-bracing plate (64) respectively via a height-adjusting device (72).

* * * * *